(12) United States Patent
Hennessy et al.

(10) Patent No.: US 11,795,862 B2
(45) Date of Patent: Oct. 24, 2023

(54) TRANSMISSION SYSTEM WITH PLANETARY GEARING OPERABLE IN FORWARD AND REVERSE MODES

(71) Applicant: Horton, Inc., Roseville, MN (US)

(72) Inventors: David R. Hennessy, Burnsville, MN (US); Thomas Schmidt, St. Paul, MN (US)

(73) Assignee: HORTON, INC., Roseville, MN (US)

( * ) Notice: Subject to any disclaimer, the term of this patent is extended or adjusted under 35 U.S.C. 154(b) by 177 days.

(21) Appl. No.: 17/596,555

(22) PCT Filed: Jun. 9, 2020

(86) PCT No.: PCT/US2020/036751
§ 371 (c)(1),
(2) Date: Dec. 13, 2021

(87) PCT Pub. No.: WO2020/263553
PCT Pub. Date: Dec. 30, 2020

(65) Prior Publication Data
US 2022/0268198 A1    Aug. 25, 2022

Related U.S. Application Data

(60) Provisional application No. 62/868,216, filed on Jun. 28, 2019.

(51) Int. Cl.
*F16H 63/30* (2006.01)
*F16H 37/02* (2006.01)
(Continued)

(52) U.S. Cl.
CPC ............... *F01P 5/04* (2013.01); *F16H 37/02* (2013.01); *F16H 61/30* (2013.01);
(Continued)

(58) Field of Classification Search
CPC ...... F16H 37/02; F16H 61/30; F16H 63/3026; F16H 2063/3036; F16H 59/14;
(Continued)

(56) References Cited

U.S. PATENT DOCUMENTS 2,266,740 A   12/1941   Cotterman
2,755,688 A   7/1956   Swennes
(Continued)

FOREIGN PATENT DOCUMENTS

CN   101048608 A   10/2007
CN   102713356 A   10/2012
(Continued)

OTHER PUBLICATIONS

International Search Report and Written Opinion in corresponding International Patent Application No. PCT/US2020/036751 dated Sep. 25, 2020.
(Continued)

*Primary Examiner* — Tinh Dang
(74) *Attorney, Agent, or Firm* — Westman, Champlin & Koehler, P.A.

(57) ABSTRACT

A transmission system includes planetary gearing with a ring gear, a plurality of planet gears, a carrier, and a sun gear, a forward clutch operatively connected between the ring gear and carrier, a reverse brake operatively connected between the carrier and a rotationally fixed location, and a control subsystem to switch the transmission system between forward and reverse operational modes in the which the ring gear and the sun gear rotate in the same or opposite rotational directions, respectively. A control subsystem actuation stroke can actuate both the forward clutch and the reverse brake based on a common control signal.

30 Claims, 10 Drawing Sheets

(51) Int. Cl.
*F16H 61/30* (2006.01)
*F01P 5/04* (2006.01)

(52) U.S. Cl.
CPC ....... *F16H 63/3026* (2013.01); *F16H 37/022* (2013.01); *F16H 2063/3036* (2013.01)

(58) Field of Classification Search
CPC ... F16H 3/60; F16H 3/44; F16H 59/56; F16H 57/10; F16H 61/38; F16H 37/00–14; F01P 5/05; F01P 5/04
See application file for complete search history.

(56) References Cited

U.S. PATENT DOCUMENTS

| | | | |
|---|---|---|---|
| 2,830,471 A | 4/1958 | Steiner | |
| 2,910,893 A | 11/1959 | Peras | |
| 2,945,570 A | 7/1960 | Ferguson et al. | |
| 3,468,402 A | 9/1969 | Edwards | |
| 3,478,622 A | 11/1969 | Reid | |
| 3,529,494 A | 9/1970 | Matte | |
| 3,721,135 A | 3/1973 | Kelley | |
| 4,046,239 A | 9/1977 | Tinholt | |
| 4,224,841 A | 9/1980 | Crooks | |
| 4,274,304 A | 6/1981 | Curtiss | |
| 4,476,744 A | 10/1984 | Crooks | |
| 4,569,252 A | 2/1986 | Harper | |
| 4,601,359 A | 7/1986 | Weismann et al. | |
| 4,706,521 A | 11/1987 | Anderson et al. | |
| 4,779,485 A | 10/1988 | Dollison et al. | |
| 4,916,982 A | 4/1990 | Suzuki | |
| 4,950,213 A * | 8/1990 | Morisawa | F16H 3/60 184/6.12 |
| 5,025,902 A | 6/1991 | Imai et al. | |
| 5,147,254 A | 9/1992 | Baier et al. | |
| 5,152,725 A | 10/1992 | Shank, Jr. | |
| 5,617,817 A | 4/1997 | Martin | |
| 5,766,108 A | 6/1998 | Johnston | |
| 5,782,715 A | 7/1998 | Walton et al. | |
| 5,842,947 A | 12/1998 | Weilant | |
| 5,846,153 A | 12/1998 | Matsuoka | |
| 5,890,988 A | 4/1999 | Kasuya et al. | |
| 5,947,854 A | 9/1999 | Kopko | |
| 6,013,003 A | 1/2000 | Boffelli et al. | |
| 6,019,697 A | 2/2000 | Colletti | |
| 6,055,946 A | 5/2000 | Dombek et al. | |
| 6,071,206 A | 6/2000 | Monahan et al. | |
| 6,165,099 A | 12/2000 | Pieper | |
| 6,244,965 B1 | 6/2001 | Klecker et al. | |
| 6,358,178 B1 | 3/2002 | Wittkopp | |
| 6,406,400 B1 | 6/2002 | Shih | |
| 6,824,494 B2 * | 11/2004 | Yasuda | F16H 57/08 475/315 |
| 6,835,158 B2 | 12/2004 | Sugiura et al. | |
| 6,962,547 B2 | 11/2005 | Inoue et al. | |
| 7,186,203 B2 | 3/2007 | Tabata et al. | |
| 7,198,587 B2 | 4/2007 | Samie et al. | |
| 7,309,067 B2 | 12/2007 | Kita | |
| 7,955,209 B2 | 6/2011 | Nett et al. | |
| 8,298,112 B2 | 10/2012 | Takada | |
| 8,303,459 B2 | 11/2012 | Kawai | |
| 8,491,440 B2 | 7/2013 | Kimes et al. | |
| 8,784,258 B2 | 7/2014 | Hoffman et al. | |
| 8,954,247 B2 | 2/2015 | Kushiyama et al. | |
| 8,986,149 B2 | 3/2015 | Han | |
| 8,986,157 B2 | 3/2015 | Kimes | |
| 9,334,788 B2 | 5/2016 | Stone et al. | |
| 9,568,260 B2 | 2/2017 | Stone et al. | |
| 10,082,350 B2 | 9/2018 | Stone et al. | |
| 2002/0036120 A1 * | 3/2002 | Omote | F16H 57/0489 184/6.12 |
| 2003/0232693 A1 * | 12/2003 | Kakamu | F16H 57/08 475/331 |
| 2005/0137044 A1 * | 6/2005 | Knowles | F16H 63/3026 475/116 |
| 2017/0342988 A1 | 11/2017 | Marcant | |
| 2018/0162217 A1 | 6/2018 | Stahl et al. | |

FOREIGN PATENT DOCUMENTS

| | | |
|---|---|---|
| CN | 105008744 A | 10/2015 |
| CN | 105605184 A | 5/2016 |
| CN | 109681593 A | 4/2019 |
| DE | 10307789 A1 | 9/2003 |
| DE | 102005040862 A1 | 3/2007 |
| EP | 0216318 B2 | 7/1992 |
| EP | 2247836 B1 | 6/2017 |
| JP | S6444232 U | 3/1989 |
| JP | H05180302 A | 7/1993 |
| JP | H06323378 A | 11/1994 |
| JP | H07243500 A | 9/1995 |
| JP | 2000-055150 A | 2/2000 |
| JP | 2000-092611 A | 3/2000 |
| JP | 2001124191 A * | 5/2001 |
| JP | 3284734 B2 | 3/2002 |
| JP | 2003-021200 A | 1/2003 |
| JP | 2004-100725 A | 4/2004 |
| JP | 2004-125055 A | 4/2004 |
| JP | 2006-220219 A | 8/2006 |
| JP | 2008-196670 A | 8/2008 |
| JP | 2010280324 A | 12/2010 |
| JP | 2015009679 A | 1/2015 |
| WO | 1999064765 A2 | 12/1999 |
| WO | 2014179719 A1 | 11/2014 |
| WO | 2014186732 A1 | 11/2014 |

OTHER PUBLICATIONS

Office Action in corresponding Chinese application No. 202080045016.8 dated Jan. 20, 2023.

\* cited by examiner ns.
TRANSMISSION SYSTEM WITH PLANETARY GEARING OPERABLE IN FORWARD AND REVERSE MODES The present application is a Section 371 National Stage Application of International Application No. PCT/US2020/036751, filed Jun. 9, 2020 and published as WO 2020/263553 A1 on Dec. 30, 2020, in English, and further claims priority to U.S. provisional patent app. Ser. No. 62/868,216, filed Jun. 28, 2019.

FIELD

The present invention relates to mechanical transmission systems capable of transmitting torque in forward and reverse rotational directions, and methods of making and using such systems. Disclosed embodiments of the present invention relate more particularly to mechanical transmission systems utilizing planetary gearing.

BACKGROUND

Many applications of agricultural, construction, mining, and similar equipment involve operation in conditions that cause the equipment's cooling system to become blocked with debris from the surrounding area. One example would be wood chips from a forest harvesting machine. The cooling system can include a heat exchanger (e.g., radiator), a simple airflow grille, and/or other typical cooling system components. When enough debris is accumulated, that debris can cause the cooling system to become ineffective and potentially lead to overheating of the engine.

Equipment cooling fans are commonly mounted on a pulley-driven hub that uses the mechanical rotational power of an engine to rotate the pulley-driven hub and the associated fan. This is a simple, robust method of rotating the engine cooling fan. In recent years, the use of a clutching mechanism has also become common in these applications in order to manage a rotational speed of the fan, which offers a significant overall reduction in the power required to turn the fan as well as in the noise produced by the fan. The lower operating speed of the fan (under at least some operating conditions) also can reduce the amount of debris ingested by the cooling system. However, there are still a lot of applications where a substantial amount of debris can be pulled into the cooling system and cause blockage.

Several solutions to the problem of cooling system debris blockage are known and/or present in the market. The most common commercial solutions include the use of a hydraulic fan drive for (hydraulically) reversing the rotation of the fan in order to reverse the flow direction of fan-driven airflow, or the use of a reversing pitch fan to achieve the reversing fan-driven airflow while continuing to rotate the fan in the same direction. In both cases, the systems can be large, complex, and cumbersome. Another example of a system for reversing a direction of fan rotation is disclosed in U.S. Pat. App. Pub. No. 2017/0342988, which again is large and cumbersome, and which requires belts on both sides of the fan, making belt access for installation or maintenance difficult. An alternative approach is to provide a blower system separate from the cooling fan in order to provide a separate blower flow to clear debris, such as a system of the type disclosed in commonly-assigned U.S. Pat. Nos. 9,334,788, 9,568,260, and 10,082,350.

Continuously variable and automatic transmission systems are known for automotive applications, but such transmissions are often relatively large and complex. While such systems are well suited to vehicle main powertrain applications, they can be too large and heavy and have controls that are too complex to be practical for cooling system applications. For instance, cooling system applications may have limited engine compartment space available for cooling system components, and powertrain transmissions that may easily fit in a vehicle undercarriage mounting location may not fit within an engine compartment. Moreover, complex continuously variable and automatic transmission systems can require complex control systems governed by multiple control signals, which is undesirable for cooling system applications due to the need for undesirably complex control hardware and due to an increased risk of failures and/or control malfunctions.

It is desired to provide a mechanical transmission capable of selectively transmitting torque in either forward or reverse rotational directions, while providing a transmission package that is relatively compact, relatively low in mass, reliable even when used in demanding industrial and/or environmental conditions, and that permits relatively simple control to switch between forward and reverse operation.

SUMMARY

In one aspect, a transmission system for transmitting torque in either forward or reverse operational modes includes: planetary gearing including a ring gear rotatable about an axis of rotation, a plurality of planet gears, a carrier with the planetary gears rotatably connected to the carrier in a single-pinion configuration, and a sun gear rotatable about the axis of rotation with the planetary gears each meshed with both the ring gear and the sun gear; a forward clutch operatively connected between the ring gear and the carrier such that engagement of the forward clutch rotationally couples the ring gear and the carrier; a reverse brake operatively connected between the carrier and a rotationally fixed location such that engagement of the reverse brake causes braking of the carrier relative to the rotationally fixed location; and a control subsystem that is selectively actuatable to switch the transmission system between a forward operational mode and a reverse operational mode. In the forward operational mode, the forward clutch is engaged, the reverse brake is disengaged, and the ring gear and the sun gear are rotatable in the same rotational direction about the axis of rotation. In the reverse operational mode, the forward clutch is disengaged, the reverse brake is engaged, and the ring gear and the sun gear are rotatable in opposite rotational directions about the axis of rotation. An actuation stroke of the control subsystem is configured to actuate both the forward clutch and the reverse brake based on a common control signal.

In another aspect, a cooling system can include an internal combustion engine, a transmission system such as one described above that can selectively operate in forward and reverse operational modes, a belt engaged between the internal combustion engine and a pulley of the transmission system, and a fan rotationally fixed to the sun gear.

In another aspect, a method of making a transmission system, and a method of making a cooling system including such a transmission system, can include providing some or all of the components described above.

In another aspect, a method of selectively transmitting torque between an input and an output in either a forward rotational direction or a reverse rotational direction utilizing planetary gearing that includes a ring gear, single-pinion planet gears, a carrier, and a sun gear is provided. The method includes accepting an input torque with the ring gear; transmitting torque between the ring gear and the carrier through a forward clutch that, when engaged, rotationally couples the ring gear and the carrier to rotate in the same direction and the same or substantially the same speed; delivering an output torque to the sun gear through the planetary gearing in the forward rotational direction; receiving a common control signal with a control subsystem; producing an actuation stroke with the control subsystem in response to receipt of the common control signal, such that the actuation stroke concurrently disengages the forward clutch and engages a reverse brake; braking the carrier against rotation when the reverse brake is engaged; and delivering the output torque to the sun gear through the planetary gearing in the reverse rotational direction when the reverse brake is engaged and the forward clutch is disengaged.

In yet another aspect, a transmission system for transmitting torque to a final drive in forward and reverse operational modes includes: planetary gearing including a ring gear rotatable about an axis of rotation with the ring gear configured as a torque input to the transmission system, a plurality of planet gears, a carrier with the planetary gears rotatably connected to the carrier in a single-pinion configuration, and a sun gear rotatable about the axis of rotation with the sun gear configured as a torque output of the transmission system and with the planetary gears each meshed with both the ring gear and the sun gear; a journal bracket having a rotationally stationary shaft with the ring gear and the sun gear each rotatably supported on the shaft; a mount rotationally fixed to the sun gear with the mount being externally exposed; a forward clutch operatively connected between the ring gear and the carrier such that engagement of the forward clutch rotationally couples the ring gear and the carrier, with the forward clutch including a wet friction clutch; a reverse brake operatively connected between the carrier and a rotationally fixed location such that engagement of the reverse brake causes braking of the carrier relative to the rotationally fixed location, with the reverse brake including a wet friction clutch; and a control subsystem that is selectively actuatable to switch the transmission system between a forward operational mode, in which the ring gear and the sun gear are rotatable in the same rotational direction about the axis of rotation, and a reverse operational mode, in which the ring gear and the sun gear are rotatable in opposite rotational directions about the axis of rotation. The forward clutch and the reverse brake can be arranged concentrically relative to the axis of rotation and can at least partially overlap each other in the axial direction. The control subsystem includes: a pressure chamber; a piston positioned at least partially with the pressure chamber and operably connected to both the forward clutch and the reverse brake to selectively transmit axial forces therebetween; and a spring that spring-biases the piston to a default axial position in the pressure chamber. A common fluidic control signal can selectively pressurize the pressure chamber to translate the piston against the spring-bias of the spring to an actuated axial position. In the forward operational mode, the piston is in the default axial position, the forward clutch is engaged, and the reverse brake is disengaged. In the reverse operational mode, the piston is in the actuated axial position, the forward clutch is disengaged, and the reverse brake is engaged.

The present summary is provided only by way of example, and not limitation. Other aspects of the present invention will be appreciated in view of the entirety of the present disclosure, including the entire text, claims and accompanying figures.

Figure 1A:
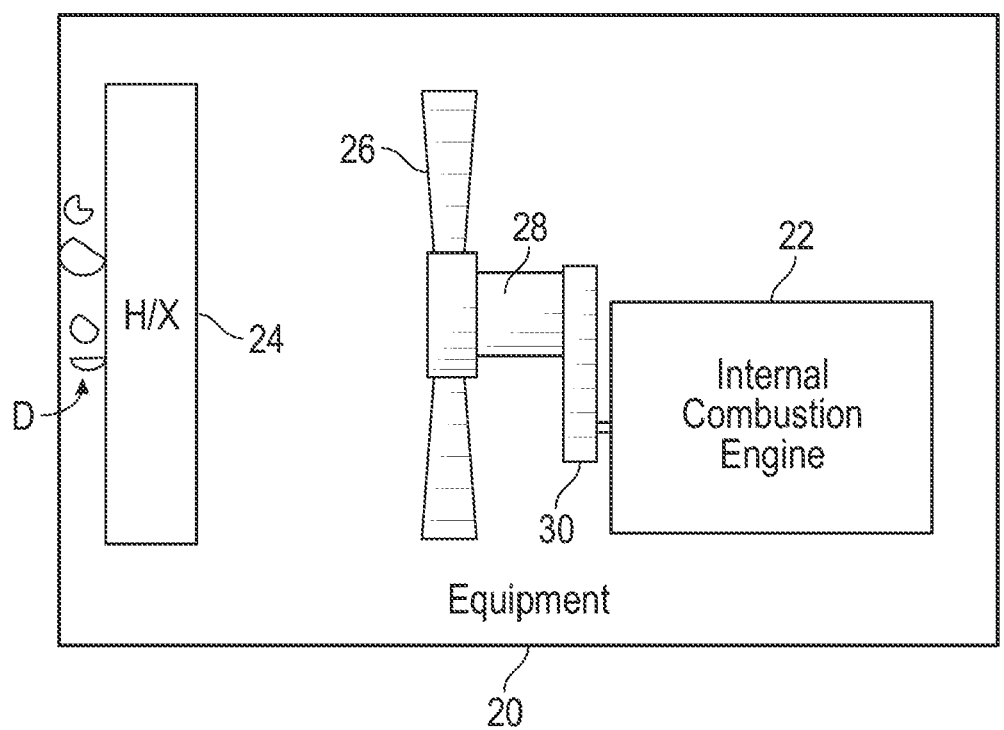
FIG. 1A is a schematic illustration of an embodiment of equipment having a cooling system with a transmission system connected between an internal combustion engine and a fan.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION OF ILLUSTRATIVE EMBODIMENTS

In general, embodiments of the present invention provide transmission systems (or devices) that can selectively deliver a torque from a prime mover (for example, an internal combustion engine) to a final drive (for example, a fan or other driven device) in forward or reverse rotational directions even when the prime mover is only capable of providing a unidirectional torque output. Some embodiments further allow fully variable speed control for torque delivered to the final drive. For example, a planetary gearing subsystem (also called epicyclic gearing) in combination with one or more clutches and/or brakes can allow a torque input that rotates in a single direction to be selectively transmitted to the final drive in the same direction or in a reverse direction in respective forward and reverse operational modes. In some embodiments, a single control subsystem can be utilized to control both a forward clutch and a reverse brake, and, in some further embodiments, the control subsystem can be governed by a common control signal (e.g., a single control signal) that can concurrently actuate multiple clutches and/or brakes in a given actuation stroke in order to switch the transmission system between forward and reverse operational modes. In some embodiments, the control subsystem can utilize a multi-part actuation stroke to provide a "soft" transition between the forward and reverse operational modes, with a temporary neutral or disengaged transitional operation mode. The present invention can be implemented, for instance, with equipment, including vehicles having cooling systems subject to clogging or obstruction by debris during operation, by allowing a fan or other cooling system component to be selectively reversed for a desired time period in order to remove some or all of that debris to help maintain efficient cooling system operation. Embodiments of the present invention can provide a transmission package with reversing capabilities that is relatively compact, relatively low in mass, reliable even when used in demanding industrial and/or environmental conditions, and that permits relatively simple control to enable switching between forward and reverse operation. Furthermore, disclosed embodiments of the present invention can avoid a need to transmit a control signal across a rotational interface to switch between forward and reverse operational modes. Other features and benefits will be recognized by those skilled in the art in view of the entirety of the present disclosure, including the accompanying figures.

The present application claims priority to U.S. Provisional Patent application Ser. No. 62/868,216, filed Jun. 28, 2019, which is hereby incorporated by reference in its entirety.

FIG. 1A schematically illustrates equipment 20 (for instance, a vehicle, industrial machine, agricultural machine, mining machine, forest/wood harvesting machine, etc.) having an internal combustion engine 22 and a cooling system that includes a heat exchanger (H/X) 24, fan 26, and a transmission 28 for controllably delivering torque from the engine 22 to the fan 26. The cooling system can be positioned within an engine compartment of the equipment 20. A belt 28 is shown connecting the engine 22 to the transmission 28, via pulleys (or sheaves), though a chain or other suitable drivetrain device can be used in further embodiments. During typical operation of the cooling system, the fan 26 draws cooling air through the heat exchanger 24 toward the engine 22, which may produce an accumulation of debris D that restricts airflow and impedes cooling system operational efficiency. More particularly, the debris D can cause physical obstruction of open areas through which cooling airflows are desired to pass into or through the equipment 20. In alternate embodiments, the heat exchanger 24 can be omitted and the fan 26 simply moves cooling air past the engine 22, in which case the debris D may simply accumulate on a grille or similar structure (for instance, located in generally the same position as the heat exchanger 24 as shown in FIG. 1A) that allows the cooling air to enter the engine compartment of the equipment 20.

However, a combustion engine (such as internal combustion engine 22) spins in only one direction when in operation. Thus, the belt 28 of the like driven by torque from the engine 22 also only spins in one rotational direction. This single rotational direction torque from the engine 22 is the input to the transmission system 28. As discussed further below, disclosed embodiments of the transmission system 28 utilize a planetary gear train, a forward clutch mechanism, and a brake mechanism to achieve a mechanical means of controllably reversing rotation of transmitted torque, thus providing a reversing hub (or reversing final drive). Reverse operation of the transmission 28 can therefore be commanded to reverse the rotation direction of the fan 26, thus forcing airflow in an opposite direction to blow away some or all of the accumulated debris D. An axial flow fan, such as the HS/11 fan available from Horton, Inc. (Roseville, MN, USA), has been found to have a suitable fan curve and static pressure, comparable to operation in the normal rotation direction but at a higher power level, when rotated in a reverse direction. In this way, a blowing or cleaning airflow can be temporarily provided by using the transmission 28 to rotate the fan 26 is a reverse direction to clear debris D. Such temporary reverse operation to clear the debris D thereby helps maintain suitably clear airflow areas, suitable cooling airflows, and associated engine cooling when the transmission 28 is switched back to forward rotation so as to rotate the fan 26 to once again draw cooling airflows into the equipment 20 toward the engine 22 and through the heat exchanger 24 (if present), grille, or the like.

Figure 1B:
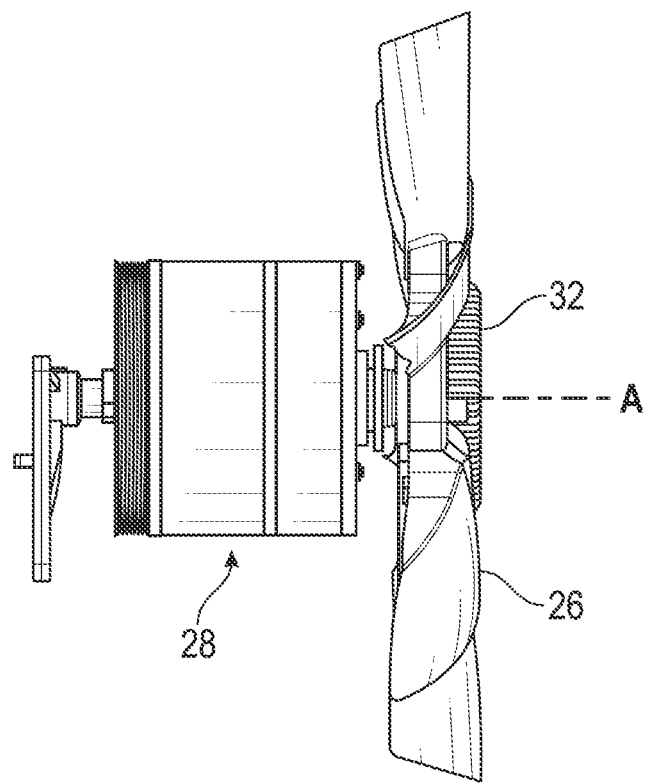
FIG. 1B is a side elevation view of the transmission system, a variable-speed clutch, and the fan.

FIG. 1B is a side elevation view of the transmission system 28 connected to the fan 26 through an optional variable-speed clutch 32. The variable-speed clutch 32 can be, for example, an electronically-controlled viscous clutch. As shown in FIG. 1B, the transmission system 28 can rotate in either forward or reverse operational modes about an axis of rotation A. The transmission system 28 as shown in the illustrated embodiment has a journal bracket to support the transmission system 28 at a desired mounting location and a pulley (or sheave) that functions as an input to accept a unidirectional torque input from the belt 30 (not shown). An output of the transmission system 28, such as an externally-facing mounting flange, shaft, or the like, is rotationally fixed to an input of the variable-speed clutch 32, and the fan 26 is in turn rotationally fixed to an output of the variable-speed clutch 32. The transmission system 28 delivers torque to the variable-speed clutch 32 in either a forward or reverse rotational direction, and the variable-speed clutch can provide fully-variable speed control of the delivery of the torque from the transmission system 28 to the fan 26. This way, the transmission system 28 can control the rotational direction of the fan, while the variable-speed clutch 32 can regulate the speed of the fan 26. In some applications and embodiments, the variable-speed clutch 32 may only be used to vary the speed of the fan 26 when the transmission system 28 is in the forward operational mode, with the variable-speed clutch 32 operating at full speed whenever the transmission system 28 is in the reverse operating mode, because reverse operation to clear debris D may be used only temporarily and full speed operation of the fan 26 can help enhance the effectiveness of debris-clearing reverse airflows. In alternate embodiments, an on/off clutch could be utilized instead of a variable-speed clutch. In still further embodiments, a clutch (e.g., a variable-speed clutch or an on/off clutch) can be integrated with the transmission system 28, such as at the output of the transmission system 28.

Figure 2A:
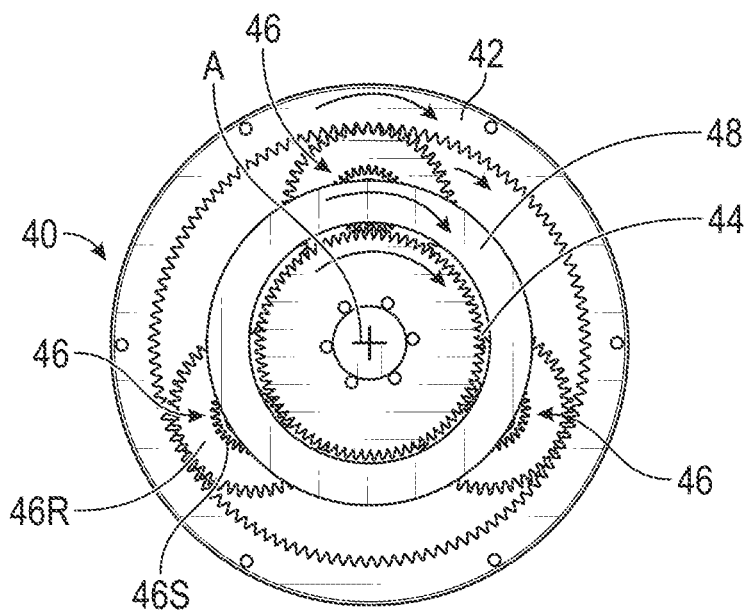
FIGS. 2A and 2B are front elevation views of planetary gearing of the transmission system, shown in isolation, under forward and reverse operating conditions, respectively.
Figure 2B:
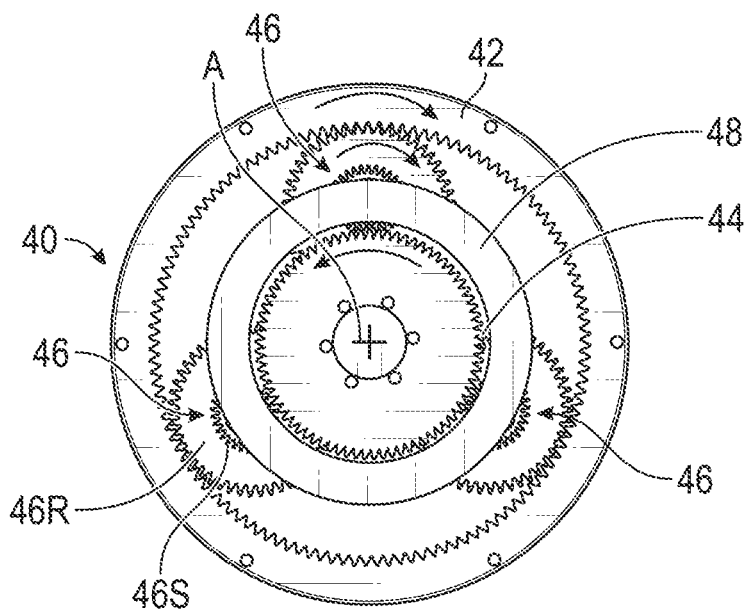

FIGS. 2A and 2B are front elevation views of planetary gearing 40 of the transmission system 28, shown in isolation, under forward and reverse operating conditions, respectively. The planetary gearing 40 includes a ring gear 42, a sun gear 44, planet gears 46, a carrier 48, and a central axis of rotation A. Relative to the axis of rotation A, the ring gear 42 is located at a radially outward location and the sun gear 44 is located at a central or radially inward location.

Typically, the ring gear 42 has radially inward facing teeth and the sun gear 44 has radially outward facing teeth. The planet gears 46 each mesh with both the ring gear 42 and the sun gear 44. As shown in the illustrated embodiment, the planet gears 46 are each rotatably connected to and carried by the carrier 48 in a single-pinion configuration, and the planet gears 46 are each compound gears having two rotationally fixed, coaxial sub-gears 46R and 46S having separate teeth to engage the ring gear 42 and the sun gear 44, respectively. The ring gear 42 can function as an input to the planetary gearing 40 and the sun gear 44 can function as an output. For example, the ring gear 42 can be connected to or integrally and monolithically formed with an input pulley or the like, and the sun gear 44 can be connected to or integrally and monolithically formed with an output hub or the like. During operation, the input to the planetary gearing 40, such as the ring gear 42, will typically receive a torque input from a combustion engine in only a single and unchanging rotational direction, as explained above with respect to FIG. 1A. But the planetary gearing 40 can be switched between forward and reverse operational modes during operation in order to switch a direction of rotation of the output, such as the sun gear 44. For instance, clutch/brake mechanisms (not shown in FIGS. 2A and 2B) can selectively engage the ring gear 42 and the carrier 48 to co-rotate about the axis of rotation A at the same or substantially the same rotational speed (in the same rotational direction) in a forward operating mode or brake rotation of the carrier 48 for a reverse operation mode. Possible embodiments of clutch/brake mechanisms are discussed further below but, initially, a general discussion of how the planetary gearing 40 operates in forward and reverse operational modes will be helpful.

As shown in FIG. 2A, the clutch/brake mechanisms are in a forward operational mode that causes the rotational input to be essentially rotationally locked with the output. More specifically, in the forward operational mode, the ring gear 42 (input), the sun gear 44 (output), and the carrier 48 all rotate about the axis of rotation A in the same direction at the same speed (clockwise as shown in FIG. 2A). In the forward operational mode as shown in FIG. 2A, the planet gears 46 do not rotate about their respective pinions but instead travel with the carrier 48 as the carrier rotates about the central axis of rotation A. In the reverse operational mode, as shown in FIG. 2B, the carrier 48 is braked and held stationary (that is, rotationally fixed), while neither the ring gear 42 nor the sun gear 44 is locked to rotation of the carrier 48, which causes the sun gear 44 (output) to rotate in the opposite direction of the ring gear 42 (input) about the axis of rotation A. That is, as shown in FIG. 2B, the ring gear 42 (input) rotates clockwise while the sun gear 44 (output) rotates counterclockwise about the axis of rotation A; further, the planet gears 46 rotate about their individual pinions but because the carrier 48 is braked the pinions for the planet gears 46 do not travel about the central axis of rotation A. Application of a brake mechanism to brake the carrier 48 can be controlled over a period of time, such as 2-5 seconds, which can allow for a smooth transition of output (for example, fan 26) loading from the forward direction to the reverse direction.

Figure 3:
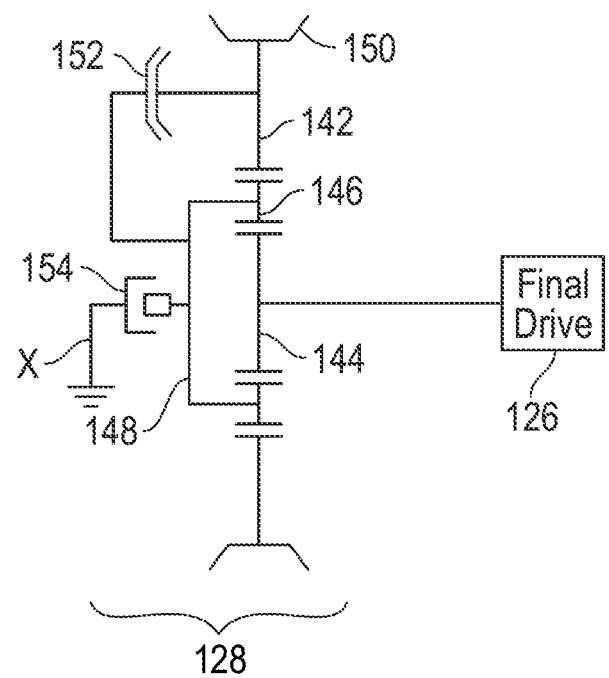
FIG. 3 is a schematic illustration of an embodiment of a transmission system

FIG. 3 is a schematic illustration of an embodiment of a transmission system 128 engaged with a final drive 126. The final drive 126 can be, for example, the cooling fan 26 or another driven device. The transmission system 128 can be used as the transmission system 28 of the equipment 20 shown in FIG. 1A, for example. Components of the transmission system 128 that are similar or identical to those previously described are given similar reference numbers generally increased by one hundred.

As shown in the embodiment of FIG. 3, the transmission system 128 includes a planetary gearing subsystem with a ring gear 142, a sun gear 144, planet gears 146, a carrier 148, a pulley (or sheave) 150, a forward clutch 152, and a reverse brake 154. The planet gears 146 each mesh with both the ring gear 142 and the sun gear 144. As shown in the illustrated embodiment, the planet gears 146 are each rotatably connected to and carried by the carrier 148 in a single-pinion configuration. The ring gear 142 is rotationally fixed to the pulley 150 and can function as an input to the transmission system 128. For instance, the belt 30 driven by the internal combustion engine 22 (see FIG. 1A) can provide a torque input in a single rotational direction to the pulley 150 and the ring gear 142. The sun gear 144 is engaged with the final drive 126 and can function as an output of the transmission system 128. The forward clutch 152 is operatively connected between the ring gear 142 and the carrier 148, and the reverse brake 154 is operatively connected between the carrier 148 and a rotationally fixed location X. The forward clutch 152 and the reverse brake 154 can each include wet friction clutch mechanisms in some embodiments, though other types of clutch and/or brake mechanisms can be utilized in further embodiments, such as dry friction clutches or the like.

The forward clutch 152 and the reverse brake 154 can be actuated in order to control operation of the transmission system 128 in order to deliver a torque output to the final drive 126 through the sun gear 144 in either forward or reverse rotational directions relative to an axis of rotation, such as in the manner described above with respect to FIGS. 2A and 2B. Engagement of the forward clutch 152 corresponds to a forward operational mode, with the ring gear 142 and the sun gear 144 rotatable in the same rotational direction, while engagement of the reverse brake 154 corresponds to a reverse operational mode, with the sun gear 144 rotatable in an opposite rotational direction from the ring gear 142. More particularly, engagement of the forward clutch 152 rotationally couples the ring gear 142 and the carrier 148, while engagement of the reverse brake 154 brakes the carrier 148 with respect to the rotationally fixed location X. A control and actuation subsystem that governs engagement and disengagement of the forward clutch 152 and the reverse brake 154 of the transmission system 128 can vary, as described below. For instance, separate actuators governed by separate control signals can be used to separately and independently engage and disengage the forward clutch 152 and the reverse brake 154. Alternatively, a common actuator and/or common control signal can be used to engage and disengage both the forward clutch 152 and the reverse brake 154 simultaneously or concurrently in a given actuation stroke. In any such embodiments, the control and actuation subsystem can be purely mechanical, such as utilizing fluidic control signal(s) (e.g., pneumatic or hydraulic control signal(s)), or can be electromechanical (e.g., with electrically-powered servo(s), solenoid(s), or the like). In this respect, the illustrated embodiment of FIG. 3 can be considered a family of related embodiments that is generic with regard to mechanism(s) for actuating the forward clutch 152 and/or the reverse brake 154.

Figure 4:
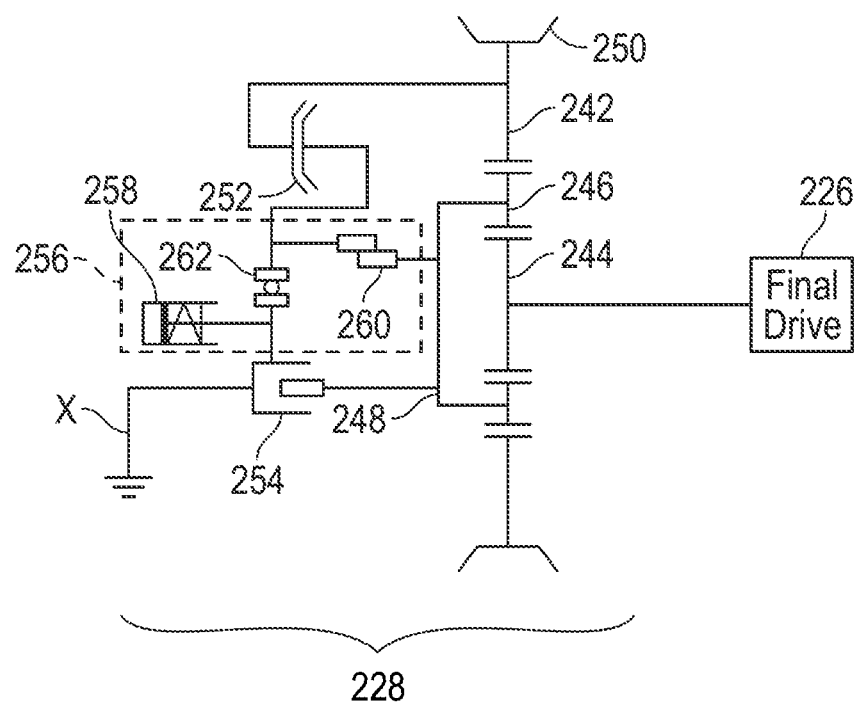
FIG. 4 is a schematic illustration of another embodiment of a transmission system.

FIG. 4 is a schematic illustration of another embodiment of a transmission system 228 engaged with a final drive 226. The final drive 226 can be, for example, the cooling fan 26 or another driven device. The transmission system 228 can be used as the transmission system 28 of the equipment 20 shown in FIG. 1A, for example. Components of the transmission system 228 that are similar or identical to those previously described are given similar reference numbers generally increased by one hundred over those used with respect to the embodiment of FIG. 3.

As shown in the embodiment of FIG. 4, the transmission system 228 includes a planetary gearing subsystem with a ring gear 242, a sun gear 244, planet gears 246, a carrier 248, a pulley (or sheave) 250, a forward clutch 252, a reverse brake 254, and a control subsystem 256. The planet gears 246 each mesh with both the ring gear 242 and the sun gear 244. As shown in the illustrated embodiment, the planet gears 246 are each rotatably connected to and carried by the carrier 248 in a single-pinion configuration. The ring gear 242 is rotationally fixed to the pulley 250 and can function as an input to the transmission system 228. For instance, the belt 30 driven by the internal combustion engine 22 (see FIG. 1A) can provide a torque input in a single rotational direction to the pulley 250 and the ring gear 242. The sun gear 244 is engaged with the final drive 226 and can function as an output of the transmission system 228. The forward clutch 252 is operatively connected between the ring gear 242 and the carrier 248, and the reverse brake 254 is operatively connected between the carrier 248 and a rotationally fixed location X. The forward clutch 252 and the reverse brake 254 can each include wet friction clutch mechanisms in some embodiments, though other types of clutch and/or brake mechanisms can be utilized in further embodiments.

The forward clutch 252 and the reverse brake 254 can be actuated by the control subsystem 256 in order to deliver a torque output to the final drive 226 through the sun gear 244 in either forward or reverse rotational directions relative to an axis of rotation, such as in the manner described above with respect to FIGS. 2A and 2B. Engagement of the forward clutch 252 corresponds to a forward operational mode, with the ring gear 242 and the sun gear 244 rotatable in the same rotational direction, while engagement of the reverse brake 254 corresponds to a reverse operational mode, with the sun gear 244 rotatable in an opposite rotational direction from the ring gear 242. More particularly, engagement of the forward clutch 252 rotationally couples the ring gear 242 and the carrier 248, while engagement of the reverse brake 254 brakes the carrier 248 with respect to the rotationally fixed location X. As shown in FIG. 4, the control subsystem 256 functions as a common actuator to commonly engage and disengage both the forward clutch 252 and the reverse brake 254. Moreover, the control subsystem 256 can be governed by a common control signal in some embodiments, such as a single fluidic control signal (for example, a pneumatic or hydraulic signal).

The control subsystem 256 of the illustrated embodiment includes one or more actuators 258 (though only a single actuator symbol is shown), a rotation/translation coupling 260, and a thrust bearing 262. The actuator(s) 258 can be biased to a default position and then selectively actuated to move to one or more other positions, though in some embodiments only two positions are necessary, namely a default-biased position and an actuated position. In some embodiments, one or more of the actuator(s) 258 can be a piston mechanism spring-biased to a default position and a fluidic control signal can selectively provide an actuation force to move (that is, translate) the piston mechanism(s) of the actuator(s) 258 against the spring-bias force. A single control signal can actuate all of the actuator(s) 258. As shown in the illustrated embodiment, the actuator(s) 258 are rotationally stationary and can be connected, directly or indirectly, to the rotationally fixed location X. The rotation/translation coupling 260 is a mechanism that can transmit rotation (torque) while permitting relative axial translation. For example, in various embodiments the rotation/translation coupling 260 can be a splined connection, a pin assembly, a plate assembly, or the like. As shown in the illustrated embodiment, the rotation/translation coupling 260 is operatively coupled between the carrier 248, the forward clutch 252, and a moveable component(s) of the actuator(s) 258 (and other associated components of the transmission system 228) to axially translate while torque is still transmittable between the forward clutch 252 and the carrier 248 across the rotation/translation coupling 260. The thrust bearing 262 allows for the transmission of the transmission of linear or translating force across a rotational interface. That is, the thrust bearing 262 allows operatively engaged components to rotate relative to each other while still permitting translating (e.g., axial translating) force between those operatively engaged components. As shown in the illustrated embodiment, the thrust bearing 262 is engaged between the forward clutch 252 and the actuator(s) 258, and allows the actuator(s) 258 to selectively transmit a translating actuation force to the forward clutch 252 while still permitting the forward clutch 252 to rotate relative to the actuator(s) 258.

The control subsystem 256 as shown in FIG. 4 is configured such that the actuator(s) 258 bias the forward clutch 252 to an engaged position by default while the actuator(s) 258 further bias the reverse brake 254 to a disengaged position by default, with these default positions corresponding to a forward operational mode of the transmission system 228. During operation of the transmission system 228, a single control signal to the actuator(s) 258 can commonly actuate both the forward clutch 252 and the reverse brake 254 in a given actuation stroke in order to concurrently or simultaneously disengage the forward clutch 252 and engine the reverse brake 254, corresponding to a reverse operation mode of the transmission system 228. In this way, the transmission system 228 as shown is configured to engage either the forward clutch 252 or the reverse brake 254 at any given time, but not both simultaneously, and the transmission system 228 can be switched between forward and reverse operational modes with a common or single control signal.

Figure 5A:
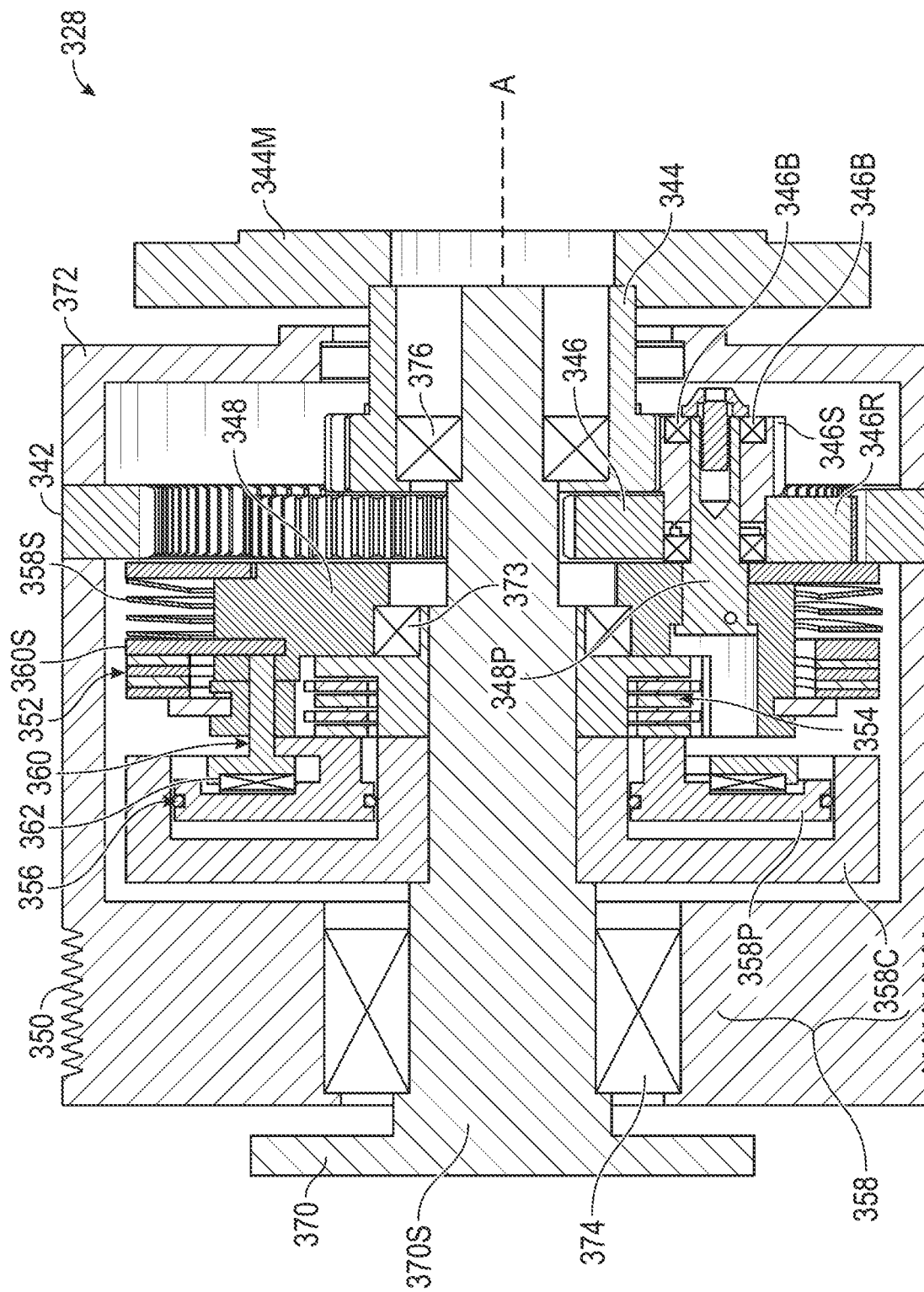
FIG. 5A is a cross-sectional view of an embodiment of a transmission system according to the present invention.
Figure 5B:
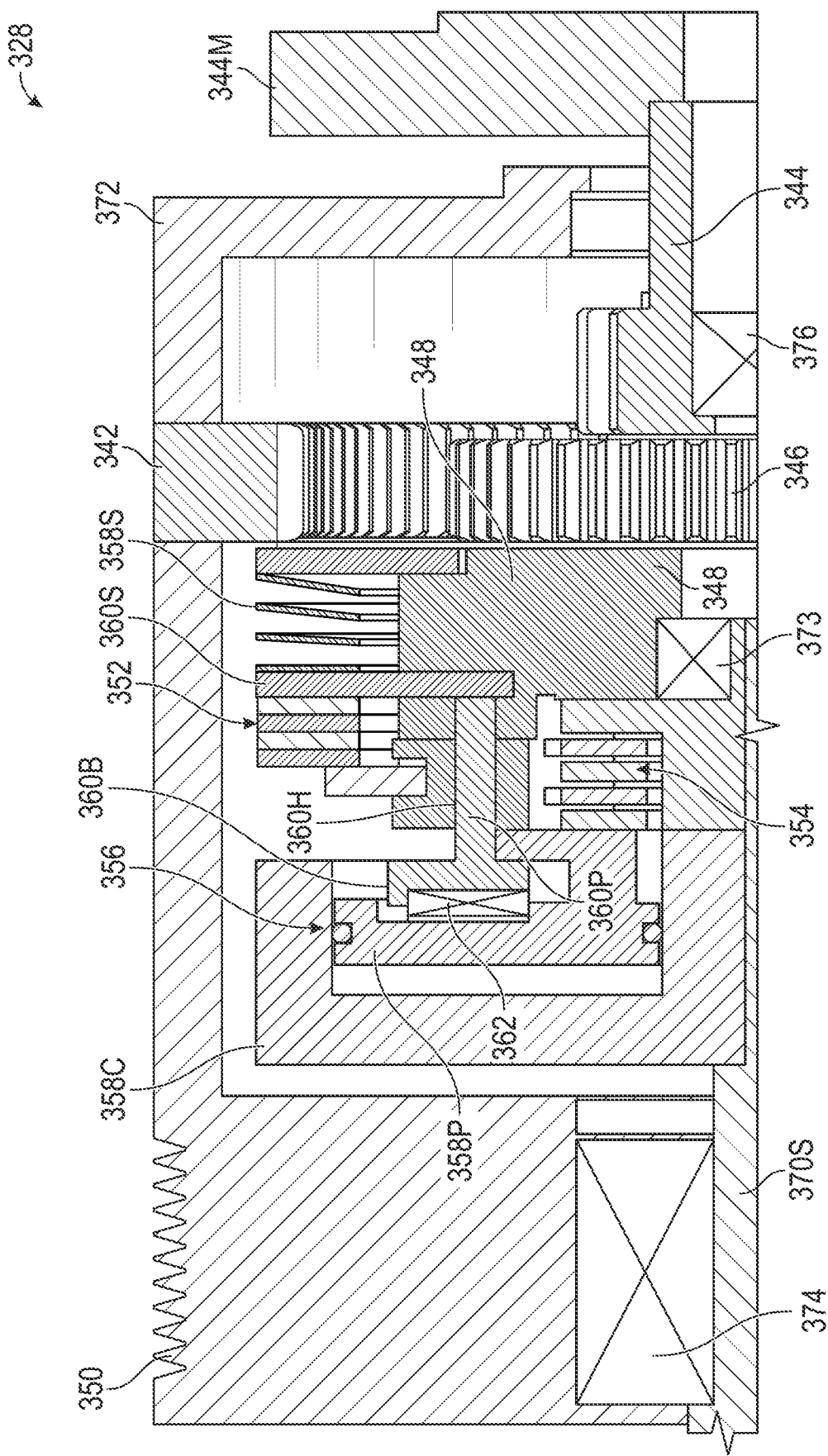
FIG. 5B is an enlarged view of a portion of the transmission system of FIG. 5A.

FIG. 5A is a cross-sectional view of an embodiment of a transmission system 328, and FIG. 5B is an enlarged view of a portion of the transmission system 328. FIGS. 5A and 5B illustrate the transmission system 328 in a forward operational mode. Bearings are shown in these figures only schematically, for simplicity. The configuration of the transmission system 328 is generally similar and consistent with that of the transmission systems 128 and 228 described above, and the transmission system 328 as illustrated can be considered a species of the transmission system 228. The transmission system 328 can be used as the transmission system 28 of the equipment 20 shown in FIG. 1A, for example. Components of the transmission system 328 that are similar or identical to those previously described are given similar reference numbers generally increased by one hundred over those used with respect to the embodiment of FIG. 4.

As shown in the embodiment of FIGS. 5A and 5B, the transmission system 328 includes a planetary gearing subsystem with a ring gear 342, a sun gear 344, planet gears 346, a carrier 348, a pulley (or sheave) 350, a forward clutch 352, a reverse brake 354, a control subsystem 356, a mount 344M, and a journal bracket 370 having a shaft 370S. The transmission system 328 defines an axis of rotation A. Similar or identical to the schematic representations of planetary gearing in FIGS. 3 and 4 as well as the elevation views in FIGS. 2A and 2B, the planet gears 346 each mesh with both the ring gear 342 and the sun gear 344. In general, the transmission system 328 provides a single-piston design that can concurrently disengage the forward clutch 352 and engage the reverse brake 354 with a single actuation stroke governed by a single actuation signal in a relatively simple manner, while also maintaining a relatively compact overall size.

As shown in the illustrated embodiment of FIGS. 5A and 5B, the planet gears 346 are each rotatably connected to and carried by the carrier 348 with pinions 348P in a single-pinion configuration, and the planet gears 346 are each compound gears having two adjacent, rotationally fixed, coaxial sub-gears 346R and 346S having separate teeth to engage the ring gear 342 and the sun gear 344, respectively. Use of compound planet gears 346 allows gear ratios to be tailored as desired for particular applications while still maintaining a relative compact overall envelope for the transmission system 328. The planetary gears 346 can be mounted on the pinions 348P on bearing sets 346B, or alternatively with journaled connections. In one embodiment, three planet gears 346 are provided, though in alternate embodiments a greater or smaller number of planet gears 346 can be utilized. In the illustrated embodiment, the carrier 348 is rotatably supported on or relative to the shaft 370S by suitable bearings 373.

The ring gear 342 is rotationally fixed to the pulley 350, such as with mechanical fasteners, and the ring gear and the pulley 350 can function as an input to the transmission system 328 so as to co-rotate at the same speed and in the same rotational direction whenever a torque input is present. In one possible application of the transmission system 328, the belt 30 driven by the internal combustion engine 22 (see FIG. 1A) can be engaged with the pulley 350 to provide a torque input in a single rotational direction to the pulley 350 and the ring gear 342. In the illustrated embodiment of FIGS. 5A and 5B, the ring gear 342 is located axially in between the pulley 350 and a cover 372, with the ring gear 342, the pulley 350, and the cover 372 all located at a generally radially outer portion of the transmission system 328, though other arrangements are possible in further embodiments. In alternate embodiments, the ring gear 342, the pulley 350, and/or the cover 372 can be integrally and monolithically formed as a single piece. Further, in the illustrated embodiment, the pulley 350 is rotationally supported on the shaft 370S by suitable bearings 374, and a seal (e.g., a dynamic seal or additional bearings) can be provided between the cover 372 and the mount 344M and/or the sun gear 344. In this way, the ring gear 342, the pulley 350, and the cover 372 can collectively provide an enclosure that protect the internal components of the transmission system 328, such as the planetary gearing and the control subsystem 356, and can help to retain lubricant inside the transmission system 328.

In the illustrated embodiment, the sun gear 344 is rotationally fixed to the mount 344M, which can be engaged with a final drive (not shown), such as a cooling fan, and the sun gear 344 and the mount 344M can function as an output of the transmission system 228. The mount 344 can be located adjacent to and outside of the cover 372, for instance, the mount 344M can be located at the frontmost or distal end of the transmission system 328 and be externally exposed. The mount 344M can be configured as a generally radially-extending flange, which can have a pilot, fastener openings and/or mechanical fasteners, or the like to facilitate direct or indirect attachment to the final drive. The mount 344M can further have a central access opening, which can provide access to the shaft 370S, and which can optionally be covered by a removable cap (not shown). As shown in the illustrated embodiment, the sun gear 344 is rotationally supported on the shaft 370S by suitable bearings 376.

Figure 6:
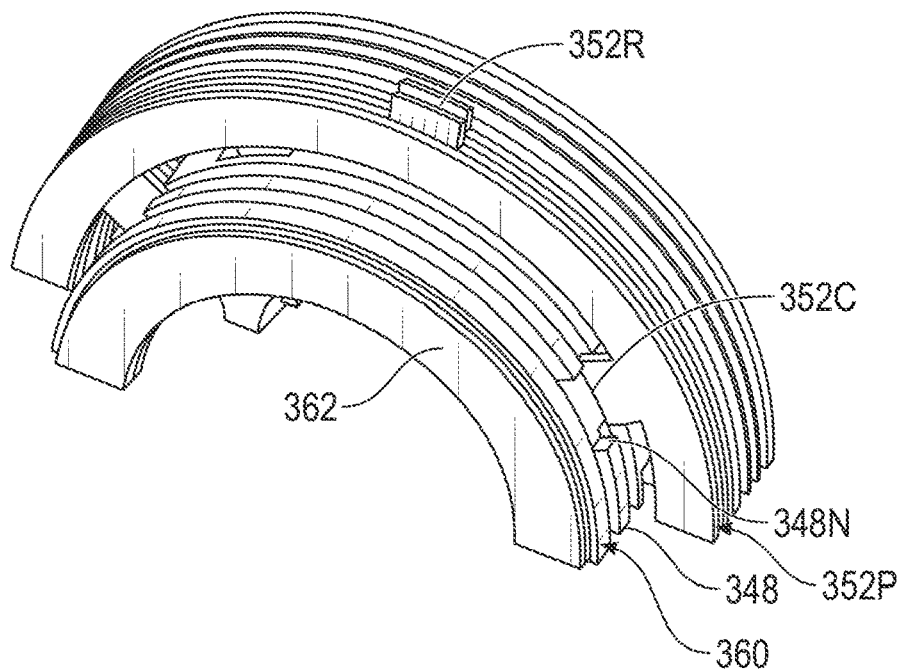
FIG. 6 is a partial perspective view of components of the transmission system of FIGS. 5A and 5B associated with a forward clutch, shown in isolation.
Figure 7:
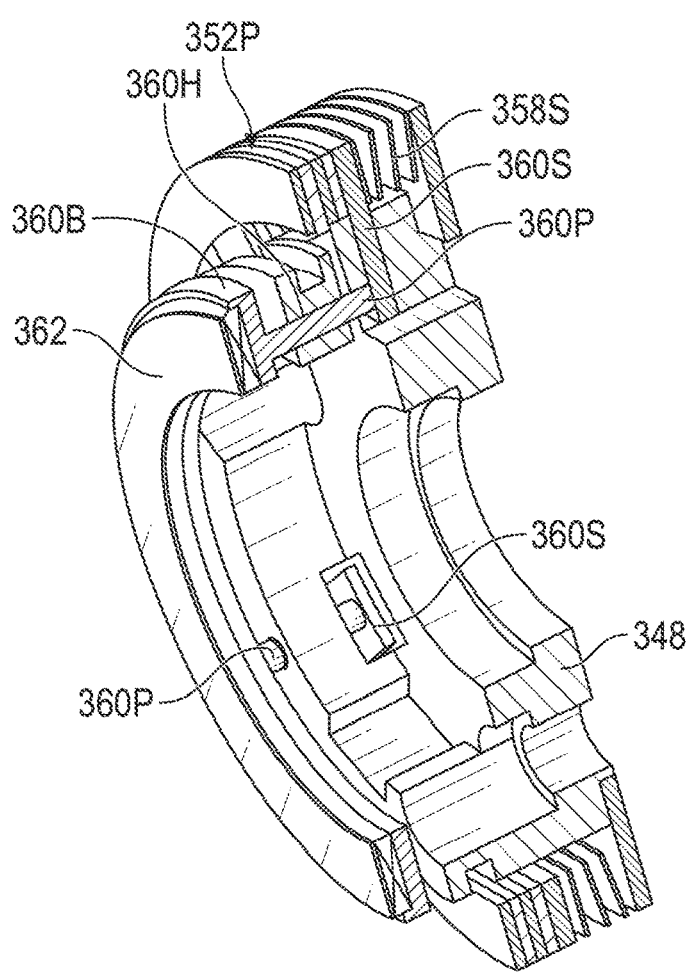
FIG. 7 is a cross-sectional perspective view of the components of the transmission system shown in FIG. 6.

The forward clutch 352 is operatively connected between the ring gear 342 and the carrier 348. In the illustrated embodiment, the forward clutch 352 is a wet friction clutch with multiple clutch plates 352P that can be selectively frictionally engaged and disengaged by the control subsystem 356. Engagement of the wet friction forward clutch 352 can be made by forcing the plates 352P together with axial force governed by the control subsystem 356, as explained further below. Although partial frictional engagement of such a wet friction forward clutch 352 is possible, allowing limited slip with a speed differential across the wet friction clutch, in a typical embodiment the wet friction forward clutch 352 is configured as an on/off clutch that is either fully disengaged so that essentially no torque is transmitted across the forward clutch 352 or fully engaged to transmit all or nearly all torque to rotate components connected across the engaged forward clutch 352 at the same or substantially the same speed. FIGS. 5A and 5B show the forward clutch 352 in a fully engaged condition. In the illustrated embodiment, and as further shown in FIGS. 6 and 7, the clutch plates 352P are arranged in an axially-extending stack with some of the clutch plates 352P having tabs 352C engaged with the carrier 348, such as being inserted at least partially into corresponding slots or notches 348N in the carrier 348, and with other clutch plates 352P having tabs 352R engaged with the pulley 350, which is rotationally fixed to the ring gear 342 such that the tabs 352R are indirectly engaged with the ring gear 342. In alternative embodiments, the tabs 352R can be directly engaged with ring gear 342 or the cover 372. The tabs 352C and 352R allow different plates 352P of the forward clutch 352 to be rotationally fixed to the carrier 348 and the ring gear 342, respectively. Engagement of the forward clutch 352 creates a frictional engagement between the ring gear 342 and the carrier 348, such that the ring gear 342 and the carrier 348 are rotationally coupled to rotate in the same rotational direction and at the same or substantially the same speed (similar to what is shown in FIG. 2A). Disengagement of the forward clutch 352 allows the ring gear 342 and the carrier 348 to rotate at different speeds, such as to allow the ring gear 342 to rotate while the carrier 348 is braked and/or remains rotationally stationary (for instance, similar to what is shown in FIG. 2B).

Figure 8:
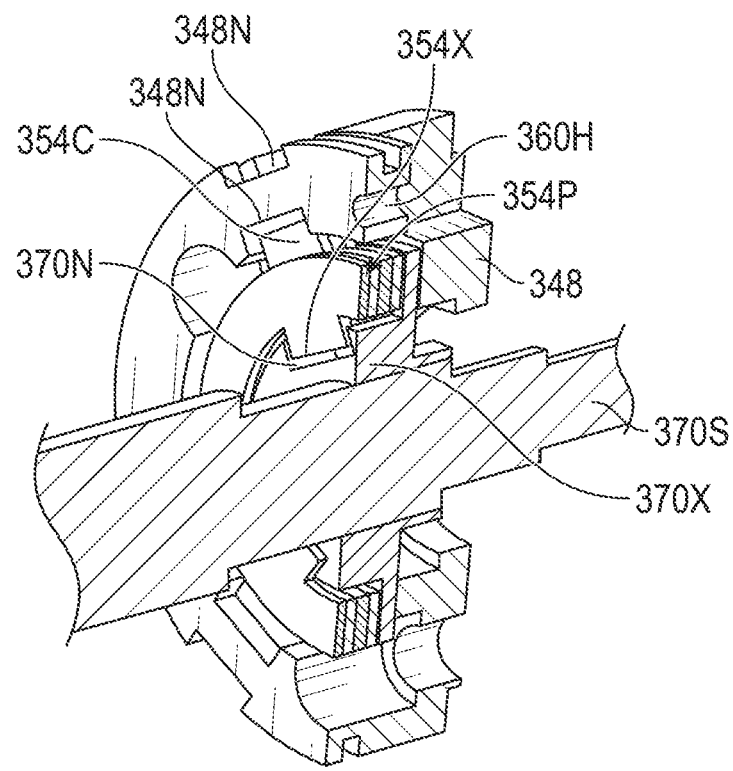
FIG. 8 is a cross-sectional perspective view of components of the transmission system of FIGS. 5A and 5B associated with a reverse brake, shown in isolation.
Figure 9:
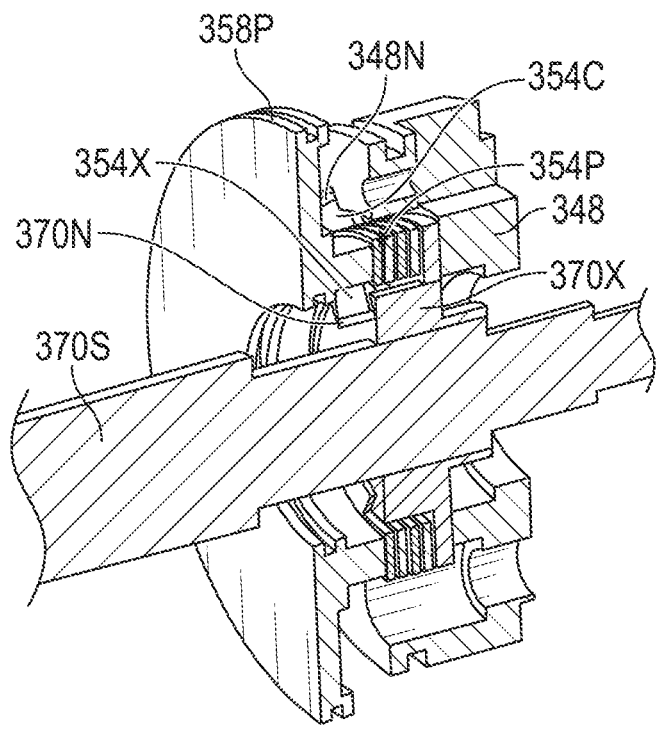
FIG. 9 is a cross-sectional perspective view of components of the transmission system of FIGS. 5A and 5B associated with the reverse brake and a piston, shown in isolation.

The reverse brake 354 is operatively connected between the carrier 348 and the shaft 370S of the journal bracket 370, which is rotationally fixed. More particularly, in the illustrated embodiment, a fixed part of the reverse brake 354 is operatively connected to a sleeve or hub 370X that is in turn rotationally fixed on the shaft 370S. In the illustrated embodiment, the reverse brake 354 is a wet friction clutch with multiple clutch plates 354P that can be selectively frictionally engaged and disengaged by the control subsystem 356. Engagement of the wet friction clutch reverse brake 354 can be made by forcing the plates 354P together with axial force governed by the control subsystem 356, as explained further below. Although partial braking is possible with such a wet friction clutch reverse brake 354, allowing limited slip relative to a rotationally fixed part of the reverse brake 354, in a typical embodiment the wet friction clutch reverse brake 354 is configured as an on/off brake that is either fully disengaged so that essentially no braking is applied to the carrier 248 or fully engaged to prevent or substantially prevent rotation of the carrier 348 relative to the shaft 370S. In the illustrated embodiment, and as further shown in FIGS. 8 and 9, the clutch plates 354P are arranged in an axially-extending stack with some of the clutch plates 354P having tabs 354C engaged with the carrier 348, such as being inserted at least partially into corresponding slots or notches 348N in the carrier 348, and with other clutch plates 354P having tabs 354X engaged with the sleeve 370X, such as being inserted at least partially into corresponding slots or notches 370N in the sleeve 370X. The sleeve 370X is rotationally fixed to the shaft 370S such that the tabs 354X are indirectly engaged with the shaft 370S of the journal bracket 370. In alternative embodiments, the tabs 354X can be directly engaged with shaft 370S or another rotationally fixed structure. The tabs 354C and 354X allow different plates 354P of the reverse brake 354 to be rotationally fixed to the carrier 348 and the journal bracket 370, respectively. Engagement of the reverse brake 354 creates a frictional engagement between the rotationally fixed journal bracket 370 (as well as the shaft 370S and the sleeve 370X) and the carrier 348, such that the carrier 348 is braked and constrained against rotation relative to the journal bracket 370, the shaft 370S, and the sleeve 370X (similar to what is shown in FIG. 2B). In other words, engaging the reverse brake 354 causes the carrier 348 to be essentially rotationally stopped and rotationally locked relative to the journal bracket 370, the shaft 370S, and the sleeve 370X. Disengagement of the reverse brake 354 allows the carrier 348 to rotate relative to the journal bracket 370, the shaft 370S, and the sleeve 370X (for instance, similar to what is shown in FIG. 2A).

The forward clutch 352 and the reverse brake 354 can be arranged concentrically, and can at least partially overlap each other in the axial direction, as shown in FIGS. 5A and 5B. Furthermore, in some embodiments, the plates 352P and 354P can be configured as generally annular disks arranged concentrically about the axis A and can occupy at least partially axially overlapping locations. A concentric, axially-overlapping arrangement of the forward clutch 352 and the reverse brake 354, or at least components thereof, helps to save axial space in the overall transmission system 328. In this way the arrangement of the forward clutch 352 and the reverse brake 354 can help promote an axially compact transmission system 328, which also permitting the control subsystem 356 to commonly actuate both forward clutch 352 and the reverse brake 354 with relatively simple single fluidic control signal (and spring biasing force). At the same time, the forward clutch 352, the reverse brake 354, and the control subsystem 356 can all be located on the same (axial) side of the planetary gear train, or at least all on the same (axial) side of the ring gear 342 and/or the sun gear 344, which can help facilitate fabrication and assembly of the transmission system 328.

The forward clutch 352 and the reverse brake 354 are actuatable by the control subsystem 356 in order to deliver a torque output through the sun gear 344 and the mount 344M in either forward or reverse rotational directions, and therefore to switch the transmission system 328 between forward and reverse operational modes. Engagement of the forward clutch 352 (and disengagement of the reverse brake 354) corresponds to the forward operational mode, with the ring gear 342 and the sun gear 344 rotatable in the same rotational direction, while engagement of the reverse brake 354 (and disengagement of the forward clutch 352) corresponds to a reverse operational mode, with the sun gear 344 rotatable in an opposite rotational direction from the ring gear 342, similar to the manner described above with respect to FIGS. 2A and 2B. As shown in FIGS. 5A and 5B, the control subsystem 356 functions as a common fluidic actuator to commonly engage and disengage both the forward clutch 352 and the reverse brake 354 in a given actuation stroke, that is, to concurrently engage the forward clutch 352 and disengage the reverse brake 354 or vice-versa. Moreover, the control subsystem 356 is governed by spring bias force and a common fluidic control signal (for example, a single pneumatic or hydraulic signal).

The control subsystem 356 of the illustrated embodiment includes a piston actuator 358, a pusher pin subassembly 360 that functions as a rotation/translation coupling, and a thrust bearing 362. A fluidic supply line (not shown) would supply a fluidic control signal to the piston actuator 358 from an external fluid source governed by a suitable pump, valve, or the like. Such a fluidic supply line can be rotationally stationary in some embodiments, and to the extent the fluidic supply line passes through components of the transmission system 328 the fluidic supply line can pass through only rotationally stationary components like the shaft 370S, the sleeve 370X, or the like. The provision of fluidic control signals in automotive and cooling system applications, such as to actuate on/off dry friction fan clutches, is well known. Therefore, discussion of external components to supply a fluidic control signal to the control subsystem 356 of the transmission system 328 is not necessary here.

As shown in the illustrated embodiment, the piston actuator 358 includes a pressure chamber 358C, a piston 358P, and at least one spring 358S. The piston 358P can translate relative to the pressure chamber 358C. A fluidic control signal is supplied to the pressure chamber 358C through a supply line (not shown), with pressurization within the pressure chamber 358C controlled as a function of the volume of fluid supplied to the pressure chamber 358C. In the illustrated embodiment, the piston 358P and the pressure chamber 358C are each generally annular in shape, with the pressure chamber 358C rotationally and axially fixed relative to the shaft 370S of the journal bracket 370, and with the piston 358P being positioned at least partially within the pressure chamber 358C and being axially translatable relative to the pressure chamber 358C during operation. The piston 358P is also rotationally stationary in the illustrated embodiment. One benefit of having the pressure chamber 358C (and the piston 358P) rotationally stationary is that the control signal can be delivered to the pressure chamber 358C without having to transmit that control signal across a rotational interface, which not only would increase complexity of the system but also would typically require one or more seals that would be subject to wear over time.

The spring 358S exerts a spring-bias force on the piston 358P, urging the piston 358P to a default position. As shown in FIGS. 5A, 5B, 6, and 7, the spring 358S externs an axial spring-bias force on the piston 358P that urges the piston 358P to a first, default, or fully spring-biased position, which is to the left as shown in FIGS. 5A and 5B. Additionally, in the illustrated embodiment, spring-bias force from the spring 358S concurrently urges the forward clutch 352 into engagement and the reverse brake 354 into disengagement by default, such that spring-biasing of the control subsystem 356 places the transmission system 328 in the forward operational mode by default. The spring 358S can be engaged indirectly to the carrier 348 through a mounting block or the like, or alternatively directly to the carrier 348, such that the spring-bias force applied to the forward clutch plates 352P is applied relative to the carrier 348. As explained further below, the spring 358S can be indirectly engaged with the plates 352P of the forward clutch 352 via the pusher pin subassembly 360. The spring 358S can be any suitable type of spring, such as a coil spring, wave spring, Belleville spring, or the like. Although only a single spring 358S is shown, in further embodiments an array of multiple circumferentially-spaced springs could be utilized instead. One advantage of this default spring biasing is that any control system failure or loss of a control signal, even temporarily, results in the transmission system 328 defaulting to the forward operational mode. In other words, in the absence of fluid pressure to generate a control signal to the control subsystem 356, the entire transmission system 328 can still rotate in the normal or forward direction by default. In cooling system applications, for instance, this allows the transmission system 328 to continue to transmit torque to a cooling fan 26 in the forward rotational direction to generate a cooling airflow even when the reverse operation mode to clear debris D is unavailable.

When fluid pressure is applied to the piston actuator 358, the piston 358P moves as a result. This allows the fluidic control signal to use pressure regulation to selectively actuate the piston actuator 358. More specifically, the fluidic control signal supplied to the pressure chamber 358C can selectively provide an actuation force to axially translate the piston 358P against the spring-bias force from the spring 358S toward a second, pressure-biased, or actuated position. That is, fluidic pressure on the piston 358P produced by the fluidic control signal selectively generates an axial force that opposes and overcomes the spring-bias force that axially translates the piston 358P, which translates the piston 358P to the right as shown in FIGS. 5 and 5B.

In one embodiment, the piston 358P can have a multi-part stroke, which can be tailored, for instance, by adjusting relative axial positions and/or sizes of components of the forward clutch 352, the reverse brake 354, the actuator 358, the pusher pin assembly 360, etc. A first part of the stroke of the piston 358P results in the spring 358S being partially compressed or collapsed, removing the spring-bias force on the clutch plates 352P of the forward clutch 352, causing frictional disengagement of the plates 352P and disengagement of the forward clutch 352. As the piston 358P continues to travel in a second, subsequent, and final part of the stroke, the spring 358S continues to be compressed until the plates 354P of the reverse brake 354 become frictionally engaged. This multi-part stroke results in concurrent disengagement of the forward clutch 352 and engagement of the reverse brake 354 but with a gradual or "soft" transition between forward and reverse operation modes. That is, a brief or temporary "neutral" or transitional operational mode in a middle part of the actuation stroke can be provided in which both the forward clutch 352 and the reverse brake 354 are simultaneously disengaged, such as when the piston 358P is in a generally middle axial position in between the default spring-biased axial position and the fully actuated pressure-biased axial position, in order to help reduce stresses on the system (and the final drive, etc.) when switching between the forward and reverse operational modes. Though in further embodiments strictly simultaneous engagement/disengagement of the forward clutch 352 and the reverse brake 354 at approximately the same instant (rather than at distinctly different parts of the same actuation stroke) can be provided as an alternative form of concurrent engagement.

When the reverse brake 354 is fully engaged, the carrier 348 is stopped (that is, rotationally braked) and the direction of rotation of the sun gear 344 (and the mount 344M) is reversed at a ratio set by the planetary gearing, thereby switching the transmission system 328 to the reverse operational mode. It is the pressurization generated from the fluidic control signal that is converted to the friction braking force of the reverse brake 354. Removing or stopping the fluidic control signal will result in the spring 358S disengaging the reverse brake 354 and engaging the forward clutch 352. One advantage of disclosed embodiments of the piston actuator 358 is that there is a single piston 358P that can have a relatively large surface area exposed to the pressure chamber 358C. Such a large piston surface area converts the fluidic control signal pressurization in the pressure chamber 358C into a relatively large axial force for frictionally engaging the reverse brake 354 and compressing the spring 358S to disengage the forward clutch 352 concurrently. A single piston with a relatively large surface area allows sufficient forces to be generated while allowing the transmission system 328 to remain relatively compact in size and also have relatively low mass. The presence of additional actuators, such as having an additional piston so that the forward clutch and reverse brake are independently controlled by separate actuators, would not only increase the complexity of the system but would also tend to increase the size and mass of the system.

The pusher pin subassembly 360 allows the transmission of axial translational movement while still rotating with components that it engages, in combination with the thrust bearing 362 described further below. In the illustrated embodiment, the pushed pin assembly 360 includes a generally annular base 360B connected to one or more axially-extending pins 360P that pass through corresponding axially-extending holes 360H in the carrier 348 and engage a spring block 360S. The holes 360H are generally discrete, circumferentially spaced holes, such as a generally annular array of relatively small cylindrical passages through at least part of the carrier 348. In the illustrated embodiment, the base 360B is located proximate the piston 358P, the pins 360P are each integral with the base 360B at one end and contact the spring block 360S at an opposite end, with both the pins 360P and holes 360H located radially inward of the forward clutch 352 and radially outward from the reverse brake 354 (that is, radially in between the forward clutch 352 and the reverse brake 354). The spring block 360S can be positioned axially in between the spring 358S and the plates 353P of the forward clutch 352 and extend radially inward from the forward clutch 352 and the spring 358S to the pins 360P. Moreover, the spring 358S and the piston 358P can be axially spaced apart and located on opposite sides of the spring block 360S in the axial direction. In this way, the pusher pin subassembly 260 is operatively coupled to other components to provide a mechanism that can transmit axial forces to the plates 353P of the forward clutch 352 from the spring 358S (in the form of spring-bias force) and/or the piston 358P (in the form of pressure-generated actuation force counter to the spring-bias force). The pusher pin subassembly 360 thereby provides the piston 358P with access to the spring 358S through the carrier 348. An engagement between the holes 360H and the pins 360P is made that rotationally fixes the pusher pin subassembly 360 to the carrier 348, and therefore the pusher pin assembly 360 rotates with the carrier 348 whenever the carrier rotates 348 and ceases rotation whenever the carrier 348 is fully braked. The thrust bearing 362 allows for relative rotation between the pusher pin subassembly 360, which can rotate in the forward operational mode, and the piston 358P, which is generally rotationally stationary under all operating conditions of the transmission system 328 (that is, in both forward and reverse operational modes).

The thrust bearing 362 allows force to be transmitted axially from the rotationally stationary piston 358P to the rotatable forward clutch 352 (and the rotatable pusher pin subassembly 360), while still permitting relative rotation about the axis A between those components (for example, during the forward operational mode). The thrust bearing 362 can have any suitable rolling elements, such as in a needle thrust bearing or ball thrust bearing configuration. As shown in FIGS. 5A and 5B, the thrust bearing 362 is engaged between a radially-extending portion of the piston 358P and the base 360B of the pusher pin subassembly 360, and is also located generally axially in between the radially-extending portion of the piston 358P on one side and the pusher pin subassembly 360 and the carrier 348 on an opposite side. When fluid pressure is applied to the piston 358P of the piston actuator 358, the thrust bearing 362 moves axially, thereby transmitting axial translational force to the pusher pin subassembly 360 and compressing the spring 358S and, in turn, causing the force on the clutch plates 352P to be removed, disengaging the forward clutch 352. In the absence of actuation fluid pressure on the piston 358P, the axial spring-force from the spring 358S is transmitted from the pusher pin subassembly 360 to the piston 358P through the thrust bearing 362.

There are numerous advantages and benefits provided by the arrangement and configuration of the transmission system 328. For example, first, the use of a single (fluidic) control signal prevents the forward clutch 352 and the reverse brake 354 form being inadvertently engaged simultaneously and acting against each other. There is no need to coordinate the separate control signals. Second, the control subsystem 356 is relatively simple, because the transmission system 328 needs only one external pressure source and valve or pump to operate. Third, because during normal operation the most common operating condition is to provide a torque output from the transmission system 328 to a final drive (e.g., fan 26) in the forward rotational direction, it is desirable to have the forward clutch 352 be spring engaged by default; therefore, in the event of a loss of actuating power (e.g., a loss of fluidic control signal pressure), the forward clutch 352 would continue to be engaged and the transmission system 328 would continue to operate in the forward operational mode, making the full forward speed torque output available to a final drive. Fourth, it is also desirable to have the operation of the control subsystem 356 and the transmission system 328 as a whole to be controllable by a common control signal source, such as a single hydraulic or pneumatic pressure line, which avoids the need to provide additional pressure sources and external valves, pumps, or the like, which would contribute to the space and mass associated with the transmission system 328. Additionally, the wet friction clutches of the forward clutch 352 and the reverse brake 354 are both contained inside the transmission system 328 and the space required (particularly in the axial direction) is relatively small. Persons of ordinary skill in the art will appreciate other advantages and benefits in view of the entirety of the present disclosure, including the accompanying figures.

Figure 10:
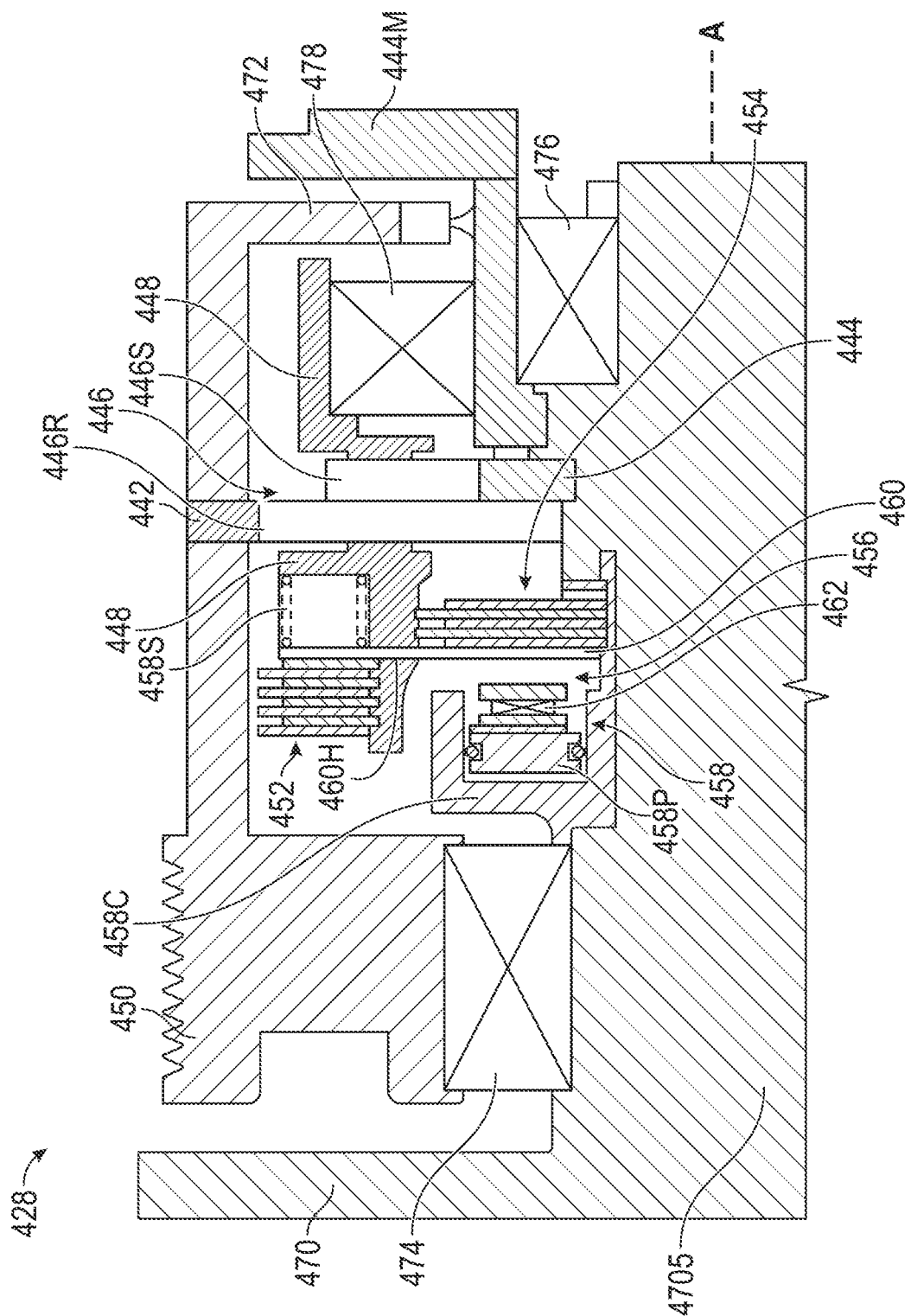
FIG. 10 is a cross-sectional view of another embodiment of a transmission system, shown only on one side of a rotational axis.

FIG. 10 is a cross-sectional view of another embodiment of a transmission system 428, shown only on one side of a rotational axis A. The configuration of the transmission system 428 is generally similar and consistent with that of the transmission systems 128 and 228 described above, and also is similar to the transmission system 328 described above, and the transmission system 428 as illustrated can be considered a species of the transmission system 228. The transmission system 428 can be used as the transmission system 28 of the equipment 20 shown in FIG. 1A, for example. Components of the transmission system 428 that are similar or identical to those previously described are given similar reference numbers generally increased by one hundred over those used with respect to the embodiment of FIGS. 5A-9. For instance, the transmission system 428 includes a planetary gearing subsystem with a ring gear 442, a sun gear 444 with a connected mount 444M, planet gears 446 (having compound sub-gears 446R and 446S), and a carrier 448, a pulley (or sheave) 450, a forward clutch 452, a reverse brake 454, a control subsystem 456 with a piston actuator 458 (having a pressure cylinder 458C, a piston 458P, and a spring 458S), a thrust bearing 462, a journal bracket 470 having a shaft 470S, a cover 472, and bearings 474, 476, and 478. The transmission system 428 defines an axis of rotation A. In general, the transmission system 428 provides a single-piston design that can concurrently or simultaneously disengage the forward clutch 452 and engage the reverse brake 454 with a single actuation signal in a relatively simple manner, while providing a relatively compact overall system package.

However, in the transmission system 428 the pusher pin subassembly 360 is replaced with a piston plate 460 having spokes that extend generally radially through holes or openings 460H in the carrier 448. As shown in FIG. 10, a radially outer end of the piston plate 460 is located axially between the forward clutch 452 (which can be a wet friction clutch with multiple clutch plates) and the spring 458S and a radially inner end of the piston plate 460 is located axially in between the reverse brake 454 (which can be a wet friction clutch with multiple clutch plates) and the thrust bearing 462. Furthermore, the illustrated embodiment of FIG. 10 has the piston 458P engaged with the thrust bearing 462 and located adjacent to the reverse brake 454 in the axial direction. Additionally, the carrier 448 has one end located at a rear side of the planet gears 446 proximate the forward clutch 452 and the reverse brake 454 and another end located on an opposite side of the carrier 448 proximate the bearing 478. The bearing 478 can rotationally support the carrier 448 on the mount 444M (or alternatively on the sun gear 444). Aside from these differences, operation of the transmission system 428 is generally similar to that of the transmission system 328.

Figure 11:
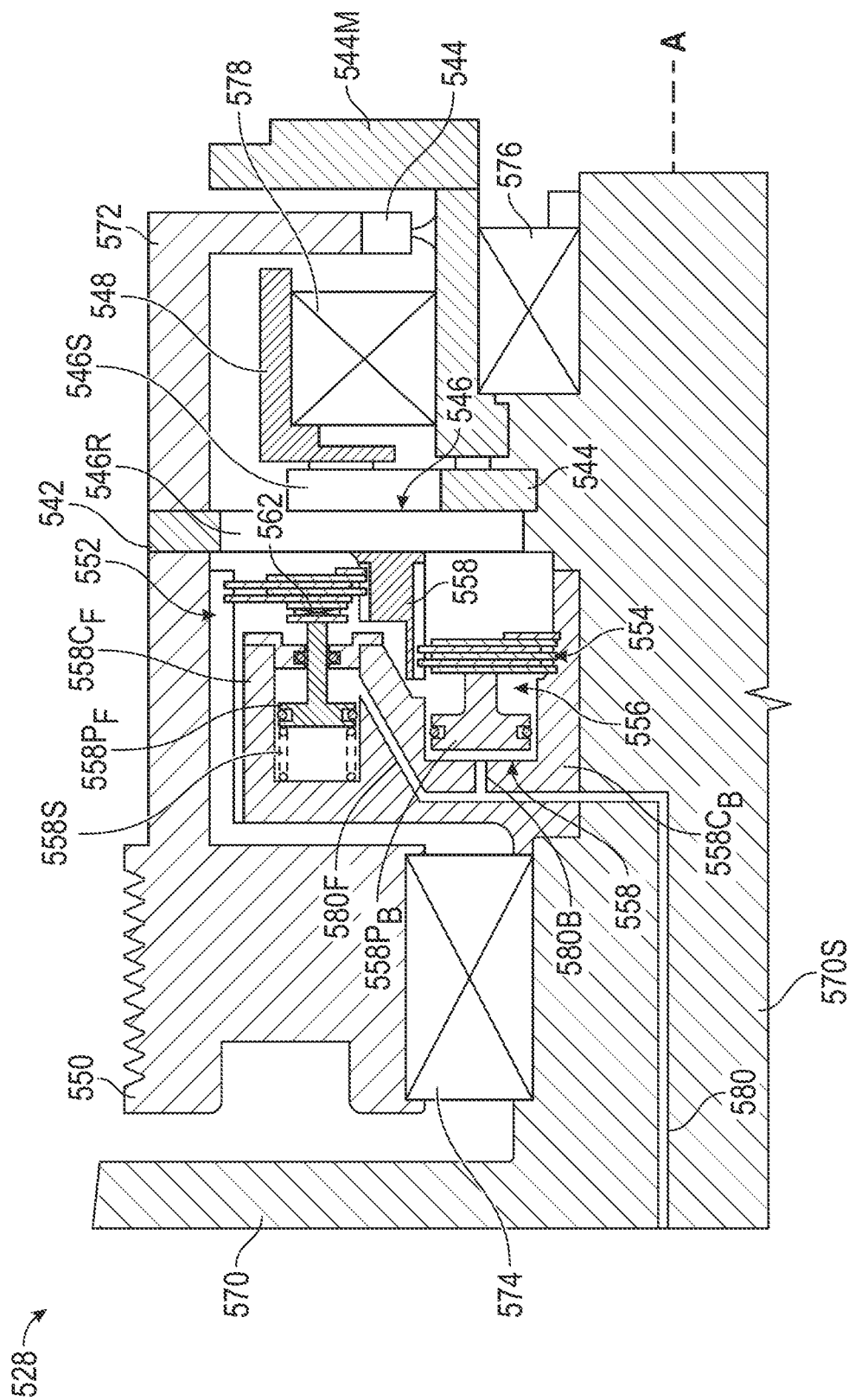
FIG. 11 is a cross-sectional view of another embodiment of a transmission system, shown only on one side of a rotational axis.

FIG. 11 is a cross-sectional view of another embodiment of a transmission system shown only on one side of a rotational axis A. The configuration of the transmission system 528 is generally similar to that of the transmission systems 128 and 228 described above, and the transmission system 528 as illustrated can be considered a species of the transmission system 128. The transmission system 528 can be used as the transmission system 28 of the equipment 20 shown in FIG. 1A, for example. Components of the transmission system 528 that are similar or identical to those previously described are given similar reference numbers generally increased by one hundred over those used with respect to the embodiment of FIG. 10. For instance, the transmission system 528 includes a planetary gearing subsystem with a ring gear 542, a sun gear 544 with a connected mount 544M, planet gears 546 (having compound sub-gears 546R and 546S), and a carrier 548, a pulley (or sheave) 550, a forward clutch 552 (which can be a wet friction clutch with multiple clutch plates), a reverse brake 554 (which can be a wet friction clutch with multiple clutch plates), a control subsystem 556, piston actuator mechanisms 558, a thrust bearing 562, a journal bracket 570 having a shaft 570S, a cover 572, and bearings 574, 576, and 578. The transmission system 528 defines an axis of rotation A.

However, in general, the transmission system 528 provides a dual-piston design that can concurrently or simultaneously disengage the forward clutch 552 and engage the reverse brake 554 with a single actuation signal in a relatively simple manner, while providing a relatively compact overall system package. As shown in FIG. 11, the piston mechanisms 558 include pressure cylinders $558C_B$ and $558C_F$, pistons $558P_B$ and $558P_F$, a spring 558S, and a pressure passage 580 with branches 580B and 580F. In this way, the illustrated embodiment of the transmission system 528 has a dual-piston arrangement with separate pistons $558P_F$ and $558P_B$ for the forward clutch 552 and the reverse brake 554, respectively, controllable via the pressure passage 580 by a single (or common) fluidic control signal, but otherwise operates like the embodiment described above with respect to FIG. 3. In this configuration, separate pressure passage branches 580F and 580B for the forward clutch 552 and the reverse brake 554, respectively, are fluidically connected to a single source via the common pressure passage 580. However, in the embodiment of FIG. 11 it is not necessary to have a pusher pin subassembly or piston plate.

Engagement and disengagement of the forward clutch 552 and the reverse brake 554 allow switching the transmission system 528 between forward and reverse operating modes in essentially the same manner described above with respect to FIGS. 2A, 2B, and 3. As shown in FIG. 11, the spring 558S biases the piston $558P_F$ for the forward clutch 552 to engage the forward clutch 552 by default, and the branch 580F of the pressure passage 580 connects with the pressure chamber $558C_F$ at an opposite side of the piston $558P_F$ from the spring 558S (that is, on the same side as the forward clutch 552), such that fluid pressure from a control signal transmitted through the pressure passage 580 acts against spring-bias force from the spring 558S in order to disengage the forward clutch 552. As shown, the piston $558P_F$ has an axially-extending shaft that protrudes from the pressure chamber $558C_F$ to transmit axial spring-bias force out of the pressure chamber $558C_F$ and to the forward clutch 552. The thrust bearing 562 can be provided between the shaft of the piston $558P_F$ and the forward clutch 552. The branch 580B of the pressure passage 580 connects to the pressure chamber $558C_B$ at an opposite side of the piston $558P_B$ from the reverse brake 554, such that pressurization produced by the fluid control signal moves the piston $558P_B$ axially against the reverse brake 554 to create a frictional braking engagement. In the illustrated embodiment, no return spring is provided for the piston $558P_B$ but such a return spring for the piston $558P_B$ could optionally be utilized in further embodiments (for example, to spring-bias the piston $558P_B$ in a direction opposite to that of the spring 558S for the piston $558P_F$).

The forward clutch 552 is spring-biased to a default engaged position. During operation, supplied pressure from the control signal transmitted along the pressure passage 580 through the branch 580F to the piston $558P_F$ can compress the spring 558S, taking the normal force from the clutch pack of the forward clutch 552, causing disengagement. Concurrently or simultaneously, pressure transmitted along the pressure passage 580 through the branch 580B to the piston $558P_B$ is built up, which causes the reverse brake 554 to engage, stopping the carrier 548 and causing the sun gear 544 to reverse rotation. In this way, the embodiment shown in FIG. 11 allows for actuation of the control subsystem 556 to be accomplished with a single pressure source, which can simultaneously act on multiple piston actuator mechanisms 558. It also allows for the default condition of the transmission system 528 in the absence of a control signal to be in the forward operating mode. Finally, the design is relatively space efficient by putting the forward clutch 552 and the reverse brake 554 (radially) stacked over each other, such as in a concentric and axially overlapping arrangement, on the same (axial) side of the planetary gear train.

Figure 12:
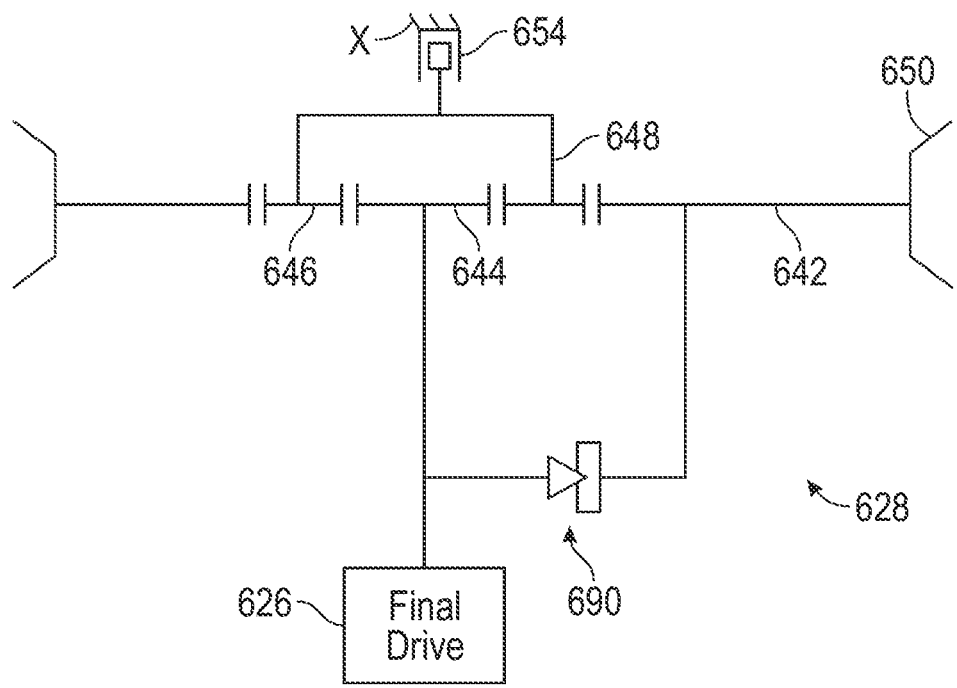
FIGS. 12 and 13 are schematic illustrations of additional embodiments of a transmission system.
Figure 13:
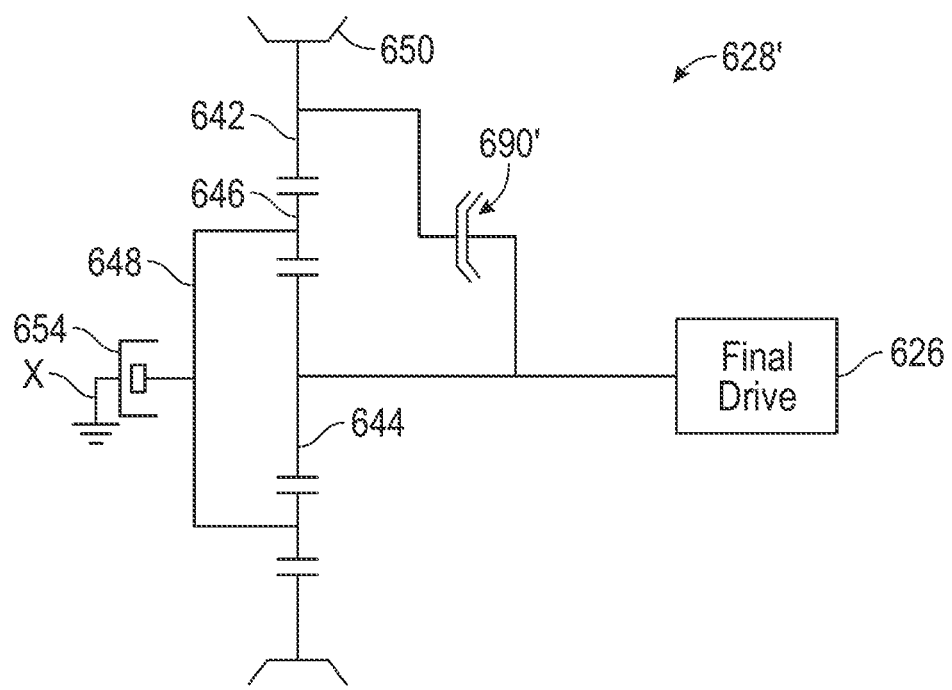

FIGS. 12 and 13 are schematic illustration of other embodiments of a transmission system 628. FIG. 12 schematically illustrates an embodiment of a transmission system 628 having a planetary gear train and a one-way clutch 690 controllably powering a final drive 626 (for example, a fan). There are three rotational legs of the planetary gear train of the transmission system 628: a ring gear 642, a sun 644, planets 646, and a carrier 648. The illustrated embodiment utilizes a single-pinion planetary gear train layout. In the illustrated embodiment, the input of the system 628 is the ring gear 642, which is attached to a pulley 650 that can be driven by the rotation of an engine via a suitable belt (see FIG. 1A), and the output of the system 628 is the sun gear 644, to which a cooling fan, fan drive, or the like could be attached. The planet carrier 648 is used to control the rotational direction of the system 628. The one-way clutch 690 (also called a freewheel, overrunning clutch, mechanical diode, or sprag style clutch) is also employed between the input and the output, that is connected between the ring gear 642 and the sun gear 644. The one-way clutch 690 only allows relative rotation between connected parts in a single direction, but rotationally fixes or locks relative rotation between connected parts in the opposite direction. A reverse brake 654 is operatively positioned between the carrier 648 and a rotationally fixed point X (such as a shaft of a mounting bracket) and is used to control the rotational speed of the carrier 648. The reverse brake 654 can be a multi-plate disc brake that is operated by a pressure signal (e.g., a pneumatically- or hydraulically-actuated wet friction clutch), or another type of clutch and/or brake. When the reverse brake 654 is disengaged, the one-way clutch 690 causes the ring gear 642 to be rotationally locked to the sun gear 644 and thus, the output is directly coupled to the input. When the reverse brake 654 is engaged, rotation of the carrier 648 is stopped; rotational power is then transferred from the ring gear 642 (input) to the sun gear 654 (output) through the planet gears 646, and the sun 644 (output) turns in the rotationally opposite direction of the ring gear 642 (input). The system 628 has a mounting surface at the output (sun gear 644, or associated sun gear shaft) that allows a fan (as an embodiment of the final drive 626) to be directly or indirectly mounted in a rotationally fixed relationship or could also have a variable fan drive mounted in between the sun gear 644 and the fan to allow for selective control of the fan speed (see FIG. 1B). In an alternate embodiment of the transmission system 628' is shown in FIG. 13, an on/off friction clutch 690' is used (instead of the one-way clutch 690) between the ring gear 642 and the sun gear 644 to allow the final drive 626 (e.g., fan) to rotate in the forward direction when the friction clutch 690' is engaged.

Presently-disclosed embodiments of a transmission system with forward and reverse operating modes have many advantages over other reversing options, such as pitch reversing fans and hydraulic reversing systems. Many engines are already equipped with a pulley hub for driving a fan, and the present transmission system can be relatively easily installed in place of such an existing pulley. Thus, the added space needed is not much greater than that for the existing pulley. The transmission system also allows for flexible configuration. In a baseline configuration, a forward speed of the fan (or other final drive) in the forward operational mode can be adjusted through the size of the pulley diameter relative to the engine speed. A reverse operational mode output speed can be adjusted via the ratio of the planetary gearing in the transmission system. The optional addition of a variable-speed fan clutch allows for full speed control of the fan or other final drive in at least the forward direction. Moreover, embodiments of the present transmission system can have relatively simple controls, and can provide for a default forward operational state in the event of a loss of a control signal. Other features and benefits will be recognized by those of ordinary skill in the art as well in view of the entirety of the present disclosure, including the accompanying figures.

Discussion of Possible Embodiments

A transmission system for transmitting torque in either forward or reverse operational modes can include: planetary gearing including: a ring gear rotatable about an axis of rotation, a plurality of planet gears, a carrier with the planetary gears rotatably connected to the carrier in a single-pinion configuration, and a sun gear rotatable about the axis of rotation with the planetary gears each meshed with both the ring gear and the sun gear; a forward clutch operatively connected between the ring gear and the carrier such that engagement of the forward clutch rotationally couples the ring gear and the carrier; a reverse brake operatively connected between the carrier and a rotationally fixed location such that engagement of the reverse brake causes braking of the carrier relative to the rotationally fixed location; and a control subsystem that is selectively actuatable to switch the transmission system between a forward operational mode and a reverse operational mode. In the forward operational mode, the forward clutch is engaged, the reverse brake is disengaged, and the ring gear and the sun gear are rotatable in the same rotational direction about the axis of rotation. In the reverse operational mode, the forward clutch is disengaged, the reverse brake is engaged, and the ring gear and the sun gear are rotatable in opposite rotational directions about the axis of rotation. An actuation stroke of the control subsystem is configured to actuate both the forward clutch and the reverse brake based on a common control signal.

The transmission system of the preceding paragraph can optionally include, additionally and/or alternatively, any one or more of the following features, configurations and/or additional components:

the control subsystem can include multiple actuators each governed by the common control signal, or, alternatively, the control subsystem can include only a single actuator governed by the common control signal;

the control subsystem can include a spring and the control subsystem can be spring-biased by the spring to the forward operational mode by default;

the common control signal can be a fluidic control signal, such as a hydraulic or pneumatic common control signal;

the control subsystem can include a pressure chamber, a piston positioned at least partially with the pressure chamber, and a spring, configured such that the spring spring-biases the piston to a default position in the pressure chamber and the fluidic control signal selectively pressurizes the pressure chamber to move the piston against the spring-bias of the spring;

the control subsystem can further include a rotation/translation coupling operatively connected between the piston, the forward clutch, and the carrier, as well as a thrust bearing operatively engaged between the rotation/translation coupling and the piston;

the rotation/translation coupling can be a pusher pin assembly, a piston plate, a spline assembly, or the like;

the spring-bias force can urge the piston to a first axial position that transmits an axial compressive engagement force to the forward clutch through the carrier and simultaneously leaves the reverse brake uncompressed and disengaged, and pressurization of the pressure chamber can urge the piston to a second axial position that leaves the forward clutch uncompressed and disengaged and simultaneously transmits an axial compressive engagement force to the reverse brake;

within the actuation stroke of the control subsystem the piston can be in a middle axial position that simultaneously leaves both the forward clutch and the reverse brake uncompressed and disengaged;

the control subsystem can include a forward clutch piston and a reverse brake piston, configured such that the forward clutch piston and the reverse brake piston are each fluidically connected to a common pressure passage through which the fluidic control signal can pass;

the forward clutch can include a multi-plate wet friction clutch;

the reverse brake can include a multi-plate wet friction clutch;

the forward clutch and the reverse brake can be arranged concentrically and can at least partially overlap each other in the axial direction;

a pulley can be rotationally fixed to the ring gear;

a journal bracket can be provided having a rotationally stationary shaft, and the ring gear and the sun gear can each be rotatably supported on the shaft;

a mount can be rotationally fixed to the sun gear, and the mount can be externally exposed; and/or the forward clutch, the reverse brake, and the control subsystem can all be located on the same side of the planetary gearing in the axial direction, or, alternatively, the forward clutch, the reverse brake, and the control subsystem can all be located on the same side of at least the ring gear and/or the sun gear in the axial direction.

A cooling system can include an internal combustion engine, a transmission system such as one described above that can selectively operate in forward and reverse operational modes, a belt engaged between the internal combustion engine and the pulley of the transmission system, and a fan rotationally fixed to the sun gear.

A method of making a transmission system, and a method of making a cooling system including such a transmission system, can include providing some or all of the components described above.

A method of selectively transmitting torque between an input and an output in either a forward rotational direction or a reverse rotational direction utilizing planetary gearing that includes a ring gear, single-pinion planet gears, a carrier, and a sun gear is disclosed. The method can include: accepting an input torque with the ring gear; transmitting torque between the ring gear and the carrier through a forward clutch that, when engaged, rotationally couples the ring gear and the carrier to rotate in the same direction and the same or substantially the same speed; delivering an output torque to the sun gear through the planetary gearing in the forward rotational direction; receiving a common control signal with a control subsystem; producing an actuation stroke with the control subsystem in response to receipt of the common control signal, such that the actuation stroke concurrently disengages the forward clutch and engages a reverse brake; braking the carrier against rotation when the reverse brake is engaged; and delivering the output torque to the sun gear through the planetary gearing in the reverse rotational direction when the reverse brake is engaged and the forward clutch is disengaged.

The method of the preceding paragraph can optionally include, additionally and/or alternatively, any one or more of the following features, configurations and/or additional steps:

spring-biasing the control subsystem to a default position in which the forward clutch is engaged and the reverse brake is disengaged;

the common control signal can be a fluidic control signal (such as a hydraulic or pneumatic common control signal) and the control subsystem can include a piston actuator biased to a default position by one or more springs, translating the piston based upon pressurization generated by the fluidic control signal to produce the actuation stroke, and when the piston is translated based upon pressurization by the fluidic control signal to produce the actuation stroke, transmitting force in the axial direction with the piston to both disengage the forward clutch and engage the reverse brake;

the force transmitted in the axial direction with the piston can be transmitted through or across a portion of the carrier;

during pressurization by the fluidic control signal, in a first part of the actuation stroke the forward clutch can be disengaged while the reverse brake remains disengaged, and in a second, subsequent part of the actuation stroke the reverse brake can be engaged while the forward clutch remains disengaged;

in a first part of the actuation stroke the forward clutch can be disengaged such that in a middle part of the actuation stroke both the forward clutch and the reverse brake are disengaged, and in a subsequent, final part of the actuation stroke the reverse brake can be engaged while the forward clutch remains disengaged;

transmitting a portion of the control signal, as a fluidic control signal, to a forward clutch piston, and concurrently transmitting another portion of the fluidic control signal to a reverse brake piston;

A transmission system for transmitting torque to a final drive in forward and reverse operational modes can include: planetary gearing including a ring gear rotatable about an axis of rotation with the ring gear configured as a torque input to the transmission system, a plurality of planet gears, a carrier with the planetary gears rotatably connected to the carrier in a single-pinion configuration, and a sun gear rotatable about the axis of rotation with the sun gear configured as a torque output of the transmission system and with the planetary gears each meshed with both the ring gear and the sun gear; a journal bracket having a rotationally stationary shaft with the ring gear and the sun gear each rotatably supported on the shaft; a mount rotationally fixed to the sun gear with the mount being externally exposed; a forward clutch operatively connected between the ring gear and the carrier such that engagement of the forward clutch rotationally couples the ring gear and the carrier, with the forward clutch including a wet friction clutch; a reverse brake operatively connected between the carrier and a rotationally fixed location such that engagement of the reverse brake causes braking of the carrier relative to the rotationally fixed location, with the reverse brake including a wet friction clutch; and a control subsystem that is selectively actuatable to switch the transmission system between a forward operational mode, in which the ring gear and the sun gear are rotatable in the same rotational direction about the axis of rotation, and a reverse operational mode, in which the ring gear and the sun gear are rotatable in opposite rotational directions about the axis of rotation. The forward clutch and the reverse brake can be arranged concentrically relative to the axis of rotation and can at least partially overlap each other in the axial direction. The control subsystem can include: a pressure chamber; a piston positioned at least partially with the pressure chamber and operably connected to both the forward clutch and the reverse brake to selectively transmit axial forces therebetween; and a spring that spring-biases the piston to a default axial position in the pressure chamber. A common fluidic control signal can selectively pressurize the pressure chamber to translate the piston against the spring-bias of the spring to an actuated axial position. In the forward operational mode the piston is in the default axial position, the forward clutch is engaged, and the reverse brake is disengaged. In the reverse operational mode the piston is in the actuated axial position, the forward clutch is disengaged, and the reverse brake is engaged.

The transmission system of the preceding paragraph can optionally include, additionally and/or alternatively, any one or more of the following features, configurations and/or additional components:

a pulley can be rotationally fixed to the ring gear;

the forward clutch, the reverse brake, and the control subsystem can all be located on the same side of the ring rear in the axial direction;

the forward clutch, the reverse brake, and the control subsystem can all be located on the same side of the planetary gearing in the axial direction; and/or axial translation of the piston to a middle axial position in between the default axial position and the actuated axial position can leave both the forward clutch and the reverse brake uncompressed and disengaged simultaneously.

A cooling system can include: an internal combustion engine; a transmission system for transmitting torque to a final drive in forward and reverse operational modes such as described above; and a belt engaged between the internal combustion engine and the pulley of the transmission system. The final drive can be or include a fan rotationally fixed to the sun gear.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, transitory signal fluctuations, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation. Furthermore, terms such as "stationary" are generally used herein in a relative sense; that is, a particular component of a transmission system may be stationary relative to a mounting location of that transmission system but that mounting location may be in equipment, such as a vehicle, that is moving.

Although the present invention has been described with reference to preferred embodiments, workers skilled in the art will recognize that changes may be made in form and detail without departing from the spirit and scope of the invention. For instance, features described with respect to one embodiment can be utilized with respect to other disclosed embodiments. Moreover, pneumatic actuation signals can be replaced with hydraulic actuation signals in various embodiments.

The invention claimed is:

1. A transmission system for transmitting torque in either forward or reverse operational modes, the transmission system comprising:
   planetary gearing including:
      a ring gear rotatable about an axis of rotation;
      a plurality of planet gears;
      a carrier, wherein the planetary gears are rotatably connected to the carrier in a single-pinion configuration; and
      a sun gear rotatable about the axis of rotation, wherein the planetary gears each mesh with both the ring gear and the sun gear;
   a forward clutch operatively connected between the ring gear and the carrier, wherein engagement of the forward clutch rotationally couples the ring gear and the carrier;
   a reverse brake operatively connected between the carrier and a rotationally fixed location, wherein engagement of the reverse brake causes braking of the carrier relative to the rotationally fixed location; and
   a control subsystem that is selectively actuatable to switch the transmission system between a forward operational mode and a reverse operational mode, wherein an actuation stroke of the control subsystem is configured to actuate both the forward clutch and the reverse brake based on a common control signal, wherein in the forward operational mode the forward clutch is engaged, the reverse brake is disengaged, and the ring gear and the sun gear are rotatable in the same rotational direction about the axis of rotation, and wherein in the reverse operational mode the forward clutch is disengaged, the reverse brake is engaged, and the ring gear and the sun gear are rotatable in opposite rotational directions about the axis of rotation.

2. The transmission system of claim 1, wherein the control subsystem includes multiple actuators each governed by the common control signal.

3. The transmission system of claim 1, wherein the control subsystem includes only a single actuator governed by the common control signal.

4. The transmission system of claim 1, wherein the control subsystem includes a spring and the control subsystem is spring-biased by the spring to the forward operational mode by default.

5. The transmission system of claim 1, wherein the common control signal is a fluidic control signal.

6. The transmission system of claim 5, wherein the control subsystem comprises:
   a pressure chamber;
   a piston positioned at least partially with the pressure chamber; and
   a spring, wherein the spring spring-biases the piston to a default position in the pressure chamber, and wherein the fluidic control signal selectively pressurizes the pressure chamber to move the piston against the spring-bias of the spring.

7. The transmission system of claim 6, the control subsystem further comprising:
   a rotation/translation coupling operatively connected between the piston, the forward clutch, and the carrier; and
   a thrust bearing operatively engaged between the rotation/translation coupling and the piston.

8. The transmission system of claim 7, wherein the rotation/translation coupling is selected from the group consisting of a pusher pin assembly and a piston plate.

9. The transmission system of claim 6, wherein the spring-bias force urges the piston to a first axial position that transmits an axial compressive engagement force to the forward clutch through the carrier and simultaneously leaves the reverse brake uncompressed and disengaged, and wherein pressurization of the pressure chamber urges the piston to a second axial position that leaves the forward clutch uncompressed and disengaged and simultaneously transmits an axial compressive engagement force to the reverse brake.

10. The transmission system of claim 9, wherein within the actuation stroke of the control subsystem the piston is in a middle axial position that simultaneously leaves both the forward clutch and the reverse brake uncompressed and disengaged.

11. The transmission system of claim 5, wherein the control subsystem includes a forward clutch piston and a reverse brake piston, and wherein the forward clutch piston and the reverse brake piston are each fluidically connected to a common pressure passage through which the fluidic control signal can pass.

12. The transmission system of claim 1, wherein the forward clutch comprises a multi-plate wet friction clutch, and wherein the reverse brake comprises a multi-plate wet friction clutch.

13. The transmission system of claim 1, wherein the forward clutch and the reverse brake are arranged concentrically and at least partially overlap each other in the axial direction.

14. A cooling system comprising:
   an internal combustion engine;
   a transmission system according to claim 1;
   a belt engaged between the internal combustion engine and a pulley of the transmission system; and
   a fan rotationally fixed to the sun gear.

15. The transmission system of claim 1 and further comprising:
   a journal bracket having a rotationally stationary shaft, wherein the ring gear and the sun gear are each rotatably supported on the shaft; and
   a mount rotationally fixed to the sun gear, wherein the mount is externally exposed.

16. The transmission system of claim 1, wherein the forward clutch, the reverse brake, and the control subsystem are all located on the same side of the planetary gearing in the axial direction.

17. A method of selectively transmitting torque between an input and an output in either a forward rotational direction or a reverse rotational direction utilizing planetary gearing that includes a ring gear, single-pinion planet gears, a carrier, and a sun gear, the method comprising:
   accepting an input torque with the ring gear;
   transmitting torque between the ring gear and the carrier through a forward clutch that, when engaged, rotationally couples the ring gear and the carrier to rotate in the same direction and at the same or substantially the same speed;
   delivering an output torque to the sun gear through the planetary gearing in the forward rotational direction;
   receiving a common control signal with a control subsystem;

producing an actuation stroke with the control subsystem in response to receipt of the common control signal, wherein the actuation stroke concurrently disengages the forward clutch and engages a reverse brake;

braking the carrier against rotation when the reverse brake is engaged; and delivering the output torque to the sun gear through the planetary gearing in the reverse rotational direction when the reverse brake is engaged and the forward clutch is disengaged.

18. The method of claim 17 and further comprising:
spring-biasing the control subsystem to a default position in which the forward clutch is engaged and the reverse brake is disengaged.

19. The method of claim 17, wherein the common control signal is a fluidic control signal and wherein the control subsystem includes a piston actuator biased to a default position by one or more springs, the method further comprising:

translating the piston based upon pressurization generated by the fluidic control signal to produce the actuation stroke; and when the piston is translated based upon pressurization by the fluidic control signal to produce the actuation stroke, transmitting force in the axial direction with the piston to both disengage the forward clutch and engage the reverse brake.

20. The method of claim 19, wherein the force transmitted in the axial direction with the piston is transmitted through a portion of the carrier.

21. The method of claim 19, wherein, during pressurization by the fluidic control signal, in a first part of the actuation stroke the forward clutch is disengaged while the reverse brake remains disengaged, and wherein in a second, subsequent part of the actuation stroke the reverse brake is engaged while the forward clutch remains disengaged.

22. The method of claim 17, wherein in a first part of the actuation stroke the forward clutch is disengaged such that in a middle part of the actuation stroke both the forward clutch and the reverse brake are disengaged, and wherein in a subsequent final part of the actuation stroke the reverse brake is engaged while the forward clutch remains disengaged.

23. The method of claim 17, wherein the common control signal is a fluidic control signal, the method further comprising:

transmitting a portion of the fluidic control signal to a forward clutch piston; and concurrently transmitting another portion of the fluidic control signal to a reverse brake piston.

24. A transmission system for transmitting torque to a final drive in forward and reverse operational modes, the transmission system comprising:

planetary gearing including:
a ring gear rotatable about an axis of rotation, wherein the ring gear is configured as a torque input to the transmission system;
a plurality of planet gears;
a carrier, wherein the planet gears are rotatably connected to the carrier in a single-pinion configuration; and
a sun gear rotatable about the axis of rotation, wherein the sun gear is configured as a torque output of the transmission system, and wherein the planetary gears each mesh with both the ring gear and the sun gear;

a journal bracket having a rotationally stationary shaft, wherein the ring gear and the sun gear are each rotatably supported on the shaft;

a mount rotationally fixed to the sun gear, wherein the mount is externally exposed;

a forward clutch operatively connected between the ring gear and the carrier, wherein engagement of the forward clutch rotationally couples the ring gear and the carrier, and wherein the forward clutch comprises a wet friction clutch;

a reverse brake operatively connected between the carrier and a rotationally fixed location, wherein engagement of the reverse brake causes braking of the carrier relative to the rotationally fixed location, wherein the reverse brake comprises a wet friction clutch, and wherein the forward clutch and the reverse brake are arranged concentrically relative to the axis of rotation and at least partially overlap each other in the axial direction; and a control subsystem that is selectively actuatable to switch the transmission system between a forward operational mode, in which the ring gear and the sun gear are rotatable in the same rotational direction about the axis of rotation, and a reverse operational mode, in which the ring gear and the sun gear are rotatable in opposite rotational directions about the axis of rotation, the control subsystem comprising:

a pressure chamber;

a piston positioned at least partially with the pressure chamber and operably connected to both the forward clutch and the reverse brake to selectively transmit axial forces therebetween; and a spring that spring-biases the piston to a default axial position in the pressure chamber, wherein a common fluidic control signal selectively pressurizes the pressure chamber to translate the piston against the spring-bias of the spring to an actuated axial position, wherein in the forward operational mode the piston is in the default axial position, the forward clutch is engaged, and the reverse brake is disengaged, and wherein in the reverse operational mode the piston is in the actuated axial position, the forward clutch is disengaged, and the reverse brake is engaged.

25. The transmission system of claim 24, wherein the forward clutch, the reverse brake, and the control subsystem are all located on the same side of the ring rear in the axial direction.

26. The transmission system of claim 25, wherein the forward clutch, the reverse brake, and the control subsystem are all located on the same side of the planetary gearing in the axial direction.

27. The transmission system of claim 24, wherein axial translation of the piston to a middle axial position in between the default axial position and the actuated axial position leaves both the forward clutch and the reverse brake uncompressed and disengaged simultaneously.

28. A cooling system comprising:
an internal combustion engine;
a transmission system according to claim 24; and
a belt engaged between the internal combustion engine and a pulley rotationally fixed to the ring gear,
wherein the final drive comprises a fan rotationally fixed to the sun gear.

29. The transmission system of claim 7, wherein the control subsystem further includes:

a spring block that extends radially, wherein the rotation/translation coupling comprises a pusher pin subassembly in contact with the spring block, wherein at least a portion of the pusher pin subassembly passes through at least a portion of the carrier and is axially translatable relative to the carrier, and wherein the piston and the spring are located on opposite sides of the spring block.

30. The transmission system of claim 6, wherein the control subsystem further includes:
- a piston plate having spokes that extend substantially radially, wherein the spokes pass through at least a portion of the carrier such that the piston plate is axially translatable relative to the carrier, wherein the piston and the spring are located on opposite sides of the piston plate; and
- a thrust bearing operatively positioned between the piston plate and the piston.

* * * * *